United States Patent
Skeist et al.

(10) Patent No.: US 6,984,897 B2
(45) Date of Patent: Jan. 10, 2006

(54) ELECTRO-MECHANICAL ENERGY CONVERSION SYSTEM HAVING A PERMANENT MAGNET MACHINE WITH STATOR, RESONANT TRANSFER LINK AND ENERGY CONVERTER CONTROLS

(75) Inventors: S. Merrill Skeist, Plainview, NY (US); Richard H. Baker, Bedford, MA (US)

(73) Assignee: Spellman High Voltage Electronics Corporation, Hauppauge, NY (US)

( * ) Notice: Subject to any disclaimer, the term of this patent is extended or adjusted under 35 U.S.C. 154(b) by 0 days.

(21) Appl. No.: 10/705,330

(22) Filed: Nov. 10, 2003

(65) Prior Publication Data

US 2004/0257832 A1 Dec. 23, 2004

Related U.S. Application Data

(60) Provisional application No. 60/442,633, filed on Jan. 23, 2003.

(51) Int. Cl.
   H02P 9/00   (2006.01)
   H02P 9/04   (2006.01)
   F03D 7/00   (2006.01)

(52) U.S. Cl. .......................................... 290/44; 290/1 R
(58) Field of Classification Search ................. 290/1 R, 290/44
   See application file for complete search history.

(56) References Cited

U.S. PATENT DOCUMENTS

| | | | | |
|---|---|---|---|---|
| 4,027,229 A | * | 5/1977 | Frink | 322/50 |
| 4,095,161 A | * | 6/1978 | Heine et al. | 318/696 |
| 4,766,362 A | * | 8/1988 | Sadvary | 322/50 |
| 4,885,493 A | * | 12/1989 | Gokhale | 310/190 |
| 4,926,105 A | * | 5/1990 | Mischenko et al. | 318/800 |
| 5,013,929 A | * | 5/1991 | Dhyanchand | 290/31 |
| 5,015,941 A | * | 5/1991 | Dhyanchand | 322/10 |
| 5,017,800 A | * | 5/1991 | Divan | 307/66 |
| 5,068,590 A | * | 11/1991 | Glennon et al. | 322/10 |
| 5,225,712 A | * | 7/1993 | Erdman | 290/44 |
| 5,270,913 A | * | 12/1993 | Limpaecher | 363/140 |
| 5,357,419 A | * | 10/1994 | Limpaecher | 363/140 |
| 5,387,859 A | * | 2/1995 | Murugan et al. | 322/10 |
| 5,561,597 A | * | 10/1996 | Limpaecher | 363/59 |
| 5,764,501 A | * | 6/1998 | Limpaecher | 363/61 |
| 5,852,559 A | * | 12/1998 | Li | 363/163 |
| 5,949,672 A | * | 9/1999 | Bernet | 363/159 |
| 5,982,645 A | * | 11/1999 | Levran et al. | 363/37 |
| 6,274,945 B1 | * | 8/2001 | Gilbreth et al. | 290/52 |
| 6,487,096 B1 | * | 11/2002 | Gilbreth et al. | 363/35 |
| 6,489,692 B1 | * | 12/2002 | Gilbreth et al. | 290/52 |
| 6,552,440 B2 | * | 4/2003 | Gilbreth et al. | 290/52 |
| 6,566,764 B2 | * | 5/2003 | Rebsdorf et al. | 290/44 |
| 6,753,619 B2 | * | 6/2004 | Stevenson et al. | 290/1 R |
| 6,784,565 B2 | * | 8/2004 | Wall et al. | 290/52 |
| 6,856,038 B2 | * | 2/2005 | Rebsdorf et al. | 290/44 |
| 6,856,040 B2 | * | 2/2005 | Feddersen et al. | 290/44 |

* cited by examiner

Primary Examiner—Darren Schuberg
Assistant Examiner—Pedro J. Cuevas
(74) Attorney, Agent, or Firm—Arthur W. Fisher, III

(57) ABSTRACT

An electro-mechanical energy conversion system coupled between an energy source and an energy load comprising an energy converter device including a permanent magnet induction machine coupled between the energy source and the energy load to convert the energy from the energy source and to transfer the converted energy to the energy load and an energy transfer multiplexer to control the flow of power or energy through the permanent magnetic induction machine.

12 Claims, 26 Drawing Sheets

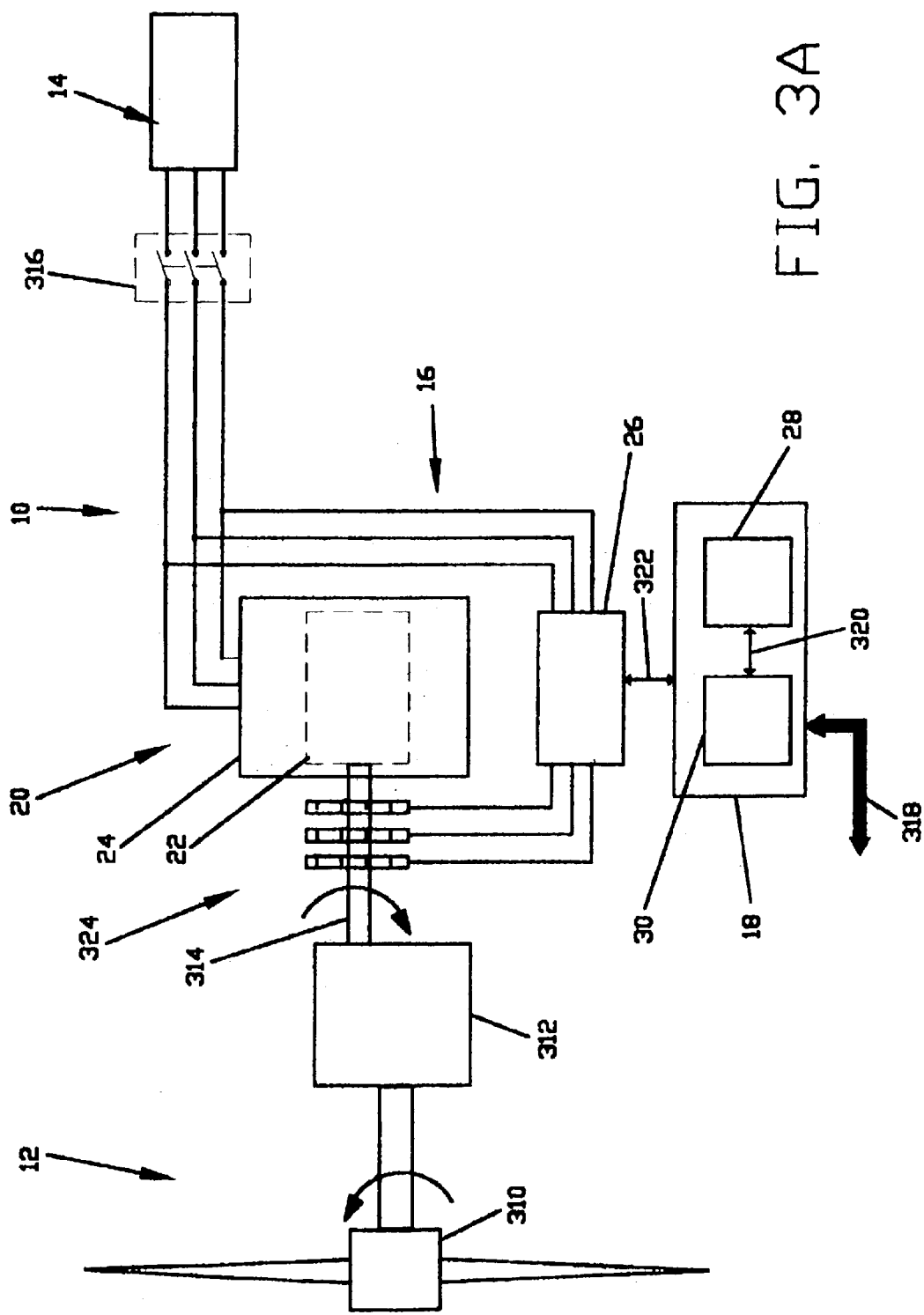

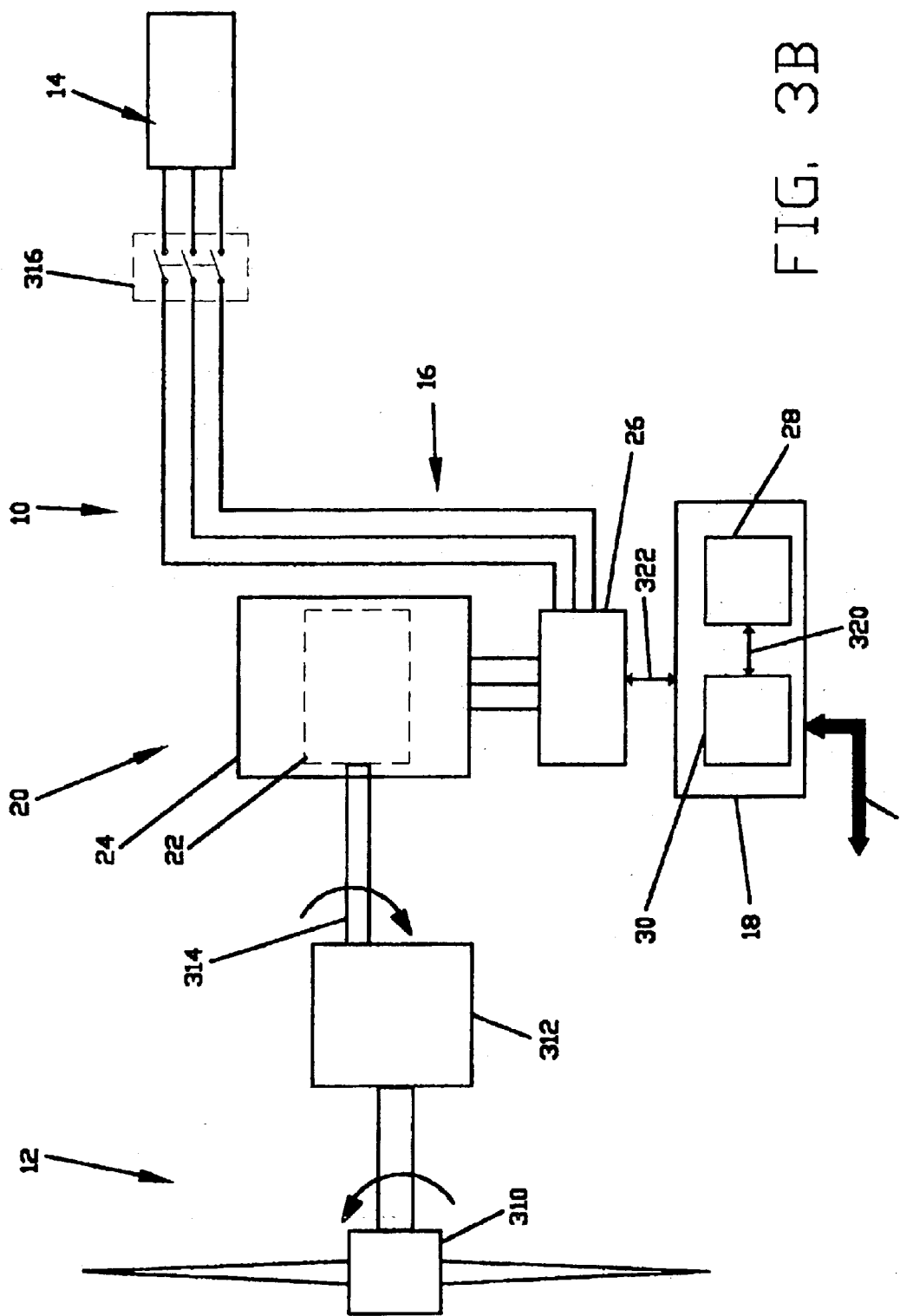

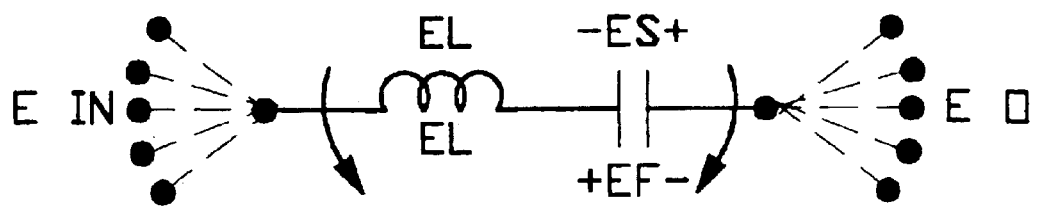
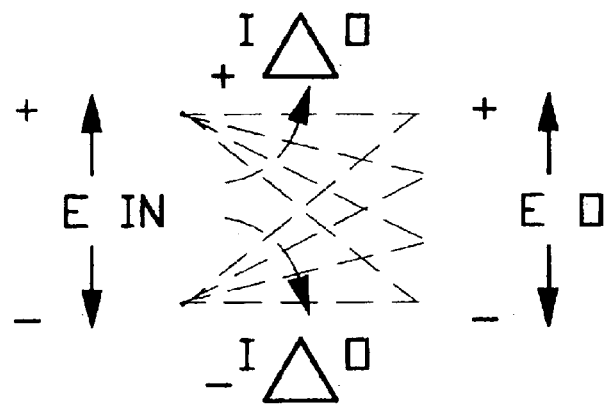
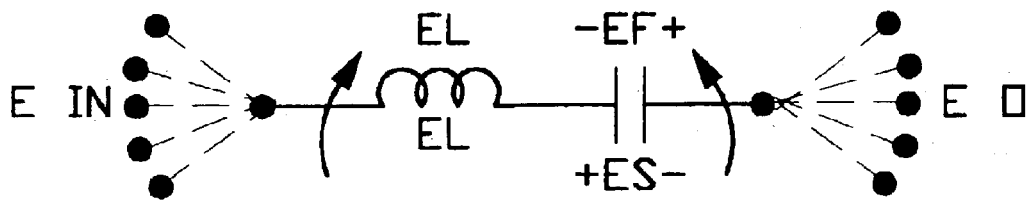
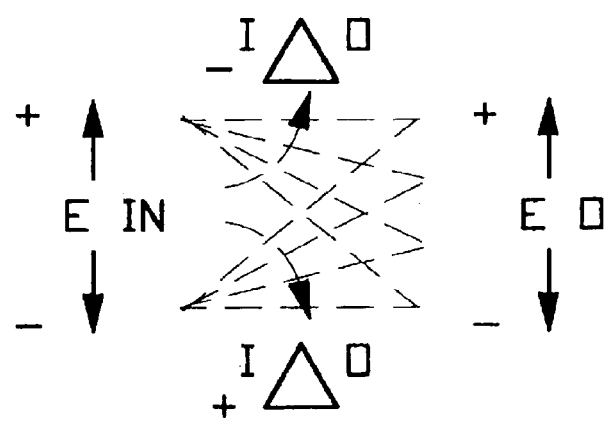
FIG. 11

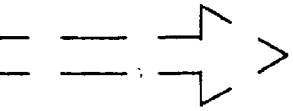
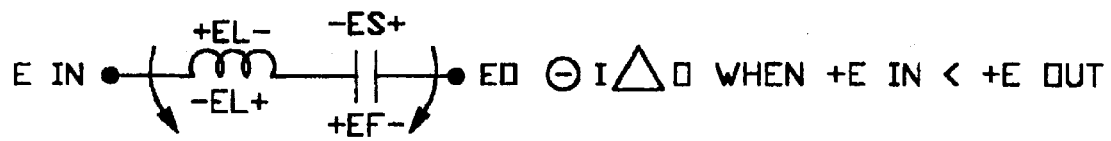
$$(\pm E\ IN) - (\pm E\ OUT) = \pm I\triangle\square$$
$$EL = ES \quad \pm I\triangle\square$$
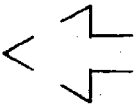
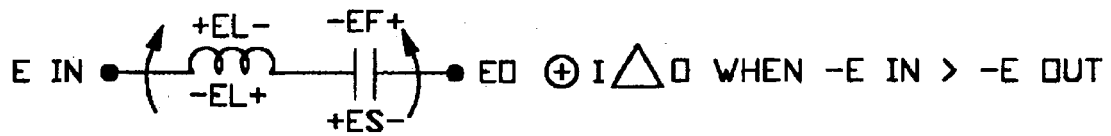
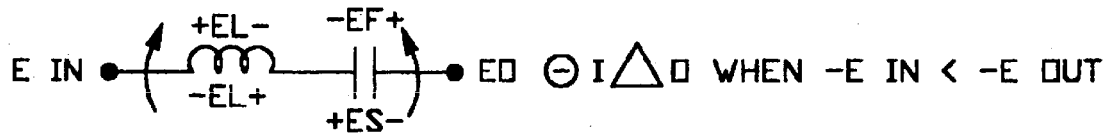
$$(\pm E\ IN) + (\pm E\ OUT) = \pm I\triangle\square$$
$$EL = ES \quad \pm I\triangle\square$$
FIG. 12

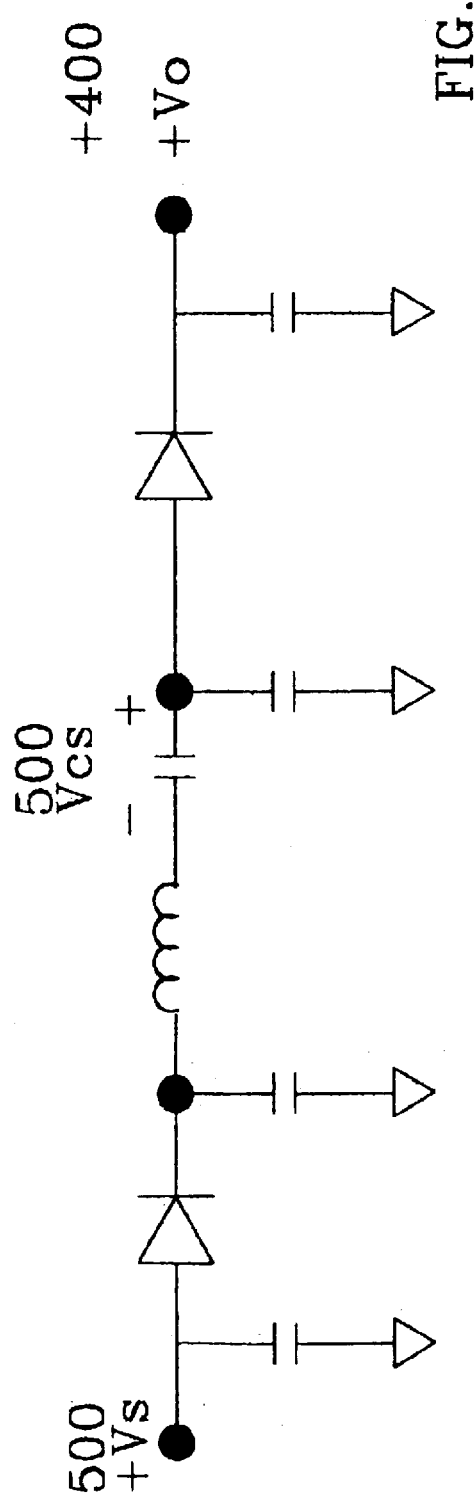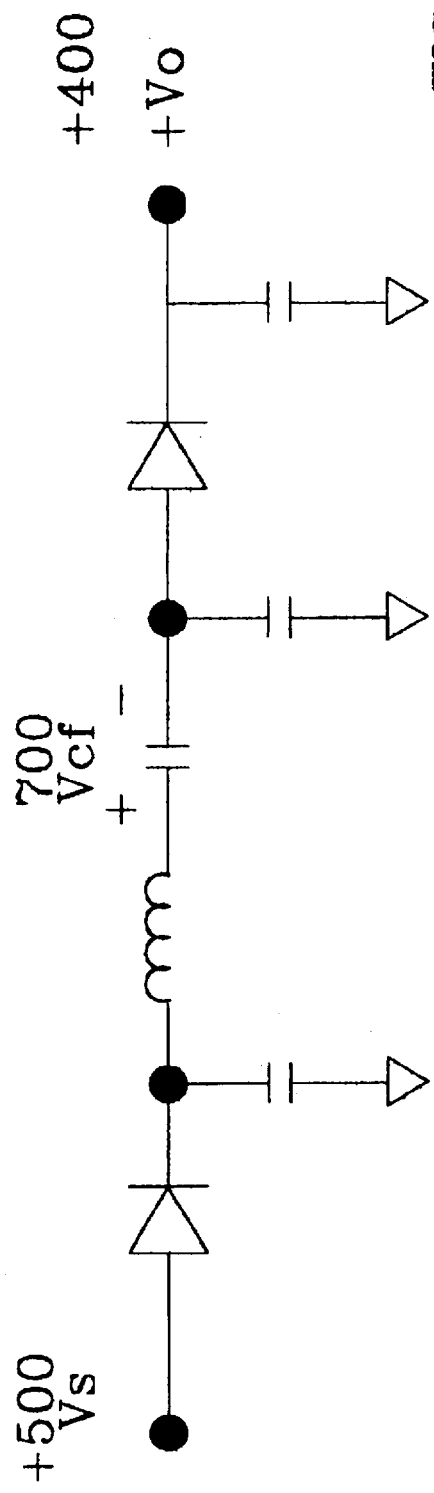
FIG. 17A
FIG. 17B

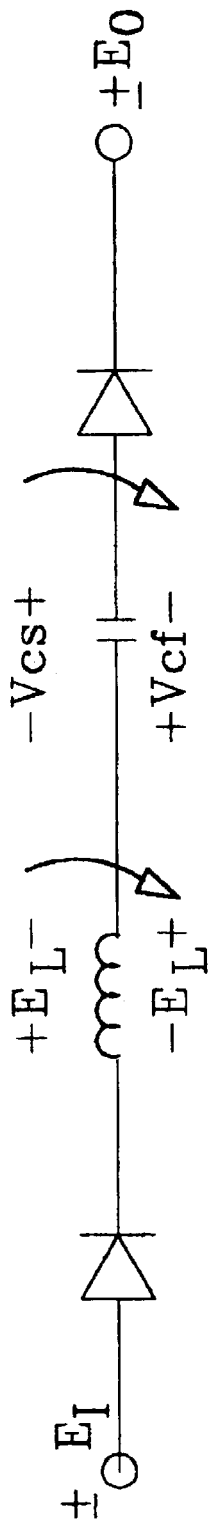
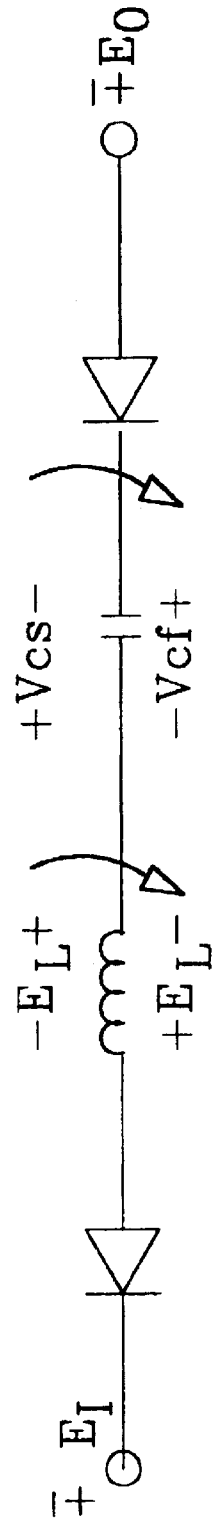

2A,2B  $|E_L| = |V_{cs}| + (\pm I \Delta_0)$ 3A,3B  $|\Delta V_c| = 2 |E_L|$

Therefore 4A,4B  $|\Delta V_c| = 2\{|V_{cs}| \pm I \Delta_0\}$ 5A,5B  $\Delta q = C |\Delta V_c| = 2C |E_L|$ 6A,6B  $I_{av} = \Delta q (PRF)$

FIG. 20

ELECTRO-MECHANICAL ENERGY CONVERSION SYSTEM HAVING A PERMANENT MAGNET MACHINE WITH STATOR, RESONANT TRANSFER LINK AND ENERGY CONVERTER CONTROLS

CROSS REFERENCE APPLICATION

This is a non-provisional patent application of provisional patent application Ser. No. 60/442,633 filed Jan. 23, 2003.

This invention was made with Government support under Contract NO. DE-FG36-03G013138 awarded by the Department of Energy. The Government has certain rights in this invention.

BACKGROUND OF THE INVENTION

1. Field of the Invention

An electro-mechanical energy conversion system including a permanent magnet induction machine to selectively convert and transfer energy from an energy source and an energy load.

2. Description of the Prior Art

Seemingly limitless electro-mechanical systems and devices have been devised to convert electrical energy to mechanical energy or vice versa.

In efforts to reduce dependency on fossil fuels, countless generator systems to convert mechanical to electrical energy including various wind power systems or wind turbines have been developed. Such systems generally include a shaft-mounted turbine to drive an electrical generator. To operate the generator at optimum speed for maximum power output, the wind turbine must produce a relatively constant torque or speed despite changes in wind speed and wind direction. Generally, the pitch of the turbine blades is varied to regulate the torque or resultant speed. Unfortunately, such pitch angle control mechanisms are complex and costly to manufacture, maintain and repair.

Moreover, such energy conversion systems using variable speed wind turbine generators to provide the source of energy to utility power grids require a matched constant output frequency at preferably optimum power output. Thus, the variable frequency AC from such turbine generators must be converted to a constant frequency AC for use by the utility power grid. Generally, this conversion can be accomplished through an intermediate conversion to DC by a rectifier and subsequent inversion to fixed-frequency AC by means of an inverter. Unfortunately, such systems are inefficient, relatively expensive, difficult to maintain operation and relatively unreliable as an electricity source.

U.S. Pat. No. 5,028,804 discloses an energy conversion generation system to receive energy from a resource and convert the energy into electrical power for supply to a polyphase electrical power grid operating at a system frequency. The controller establishes a reference signal, then processes the sensor signal with the reference signal to produce a controller signal. The converter produces the excitation power at an excitation frequency in response to the controller signal so as to increase the ratio of the electrical power output to the resource energy power input received by the prime mover.

U.S. Pat. No. 4,490,093 describes a windpower system comprising a support and a turbine having a shaft rotatively mounted to the support. The turbine has variable pitch blades controlled by the differential motion of a rotary control shaft coaxial with the turbine shaft and the turbine shaft so that the blade pitch can be varied by a stationary motor without requiring any slip rings or other such wear-prone couplings. In the event of a power failure, rotary motion of the control shaft is prevented so that the turbine blades are feathered solely due to the force developed by the rotating turbine. When the turbine is used to generate electrical power an induction generator is coupled to the turbine shaft. The shaft speed is indicative of generator output power. Thus, generator speed is monitored and used to control the pitch of the turbine blades so as to maintain generator output power at the maximum value when wind speed is below the machine's rated wind speed and no more than rated output power when wind speed exceeds rated wind speed.

U.S. Pat. No. 4,426,192 teaches a method and apparatus for controlling windmill blade pitch. The pitch of the turbine blades is based on a dual-deadband control strategy. If the current turbine speed is determined to be outside of a relatively wide deadband, action is taken to correct the speed by changing blade pitch. If the current speed is within the relatively wide deadband, then the average of the turbine speed over an interval is compared with a relatively narrow deadband within the wider deadband. Action is then taken to change the blade pitch if the average speed is outside the narrow deadband. In this way, wide excursions of turbine speed are corrected promptly, but the frequency of control actions is minimized by requiring only the average speed to be kept within tight limits.

U.S. Pat. No. 6,137,187 relates to a variable speed system such as a wind turbine comprising a wound rotor induction generator, a torque controller and a proportional, integral derivative (PID) pitch controller. The torque controller controls generator torque using field oriented control, and the PID controller performs pitch regulation based on generator rotor speed U.S. Pat. No. 5,225,712 shows a wind turbine power converter that smooths the output power from a variable speed wind turbine to reduce or eliminate substantial power fluctuations on the output line. The power converter has an AC-to-DC converter connected to a variable speed generator that converts wind energy to electric energy, a DC-to-AC inverter connected to a utility grid, and DC voltage link connected to an electrical energy storage device such as a battery or a fuel cell. An apparatus and method for controlling the instantaneous current flowing through the active switches at the line side inverter to supply reactive power to the utility grid is also disclosed. The inverter can control reactive power output as a power factor angle, or directly as a number of VARs independent of the real power. Reactive power can be controlled in an operating mode when the wind turbine is generating power, or in a static VAR mode when the wind turbine is not operating to produce real power. To control the reactive power, a voltage waveform is used as a reference to form a current control waveform for each output phase. The current control waveform for each phase is applied to a current regulator which regulates the drive circuit that controls the currents for each phase of the inverter. Means for controlling the charge/discharge ratio and the regulating the voltage on the DC voltage link is also disclosed.

U.S. Pat. No. 5,028,804 relates to an energy conversion generation system to receive energy from a resource and convert the energy into electrical power for supply to a polyphase electric power grid operating at a system frequency. A prime mover driven by the resource energy and a converter such as a power electronic converter produces excitation power from power received from a converter power source. A brushless doubly-fed generator having a rotor with rotor windings and a stator with stator windings comprises a first and second polyphase stator system. The rotor is driven by the prime mover. The first stator system supplies the electrical power to the grid, and the second stator system receives the excitation power from the converter. A sensor senses a parameter of the electrical power output supplied to the grid and produces a sensor signal corresponding to the sensed parameter. A controller controls the converter in response to the sensor signal.

U.S. Pat. No. 4,523,269 discloses a DC to N phase AC converter, a DC source having first and second terminals for deriving equal amplitude opposite polarity DC voltages, a series resonant circuit, and N output terminals, one for each phase of the converter. The series resonant circuit is selectively connected in series with the first and second terminals and the N output terminals for an interval equal to one half cycle of the resonant circuit resonant frequency, so that current flows between a selected one of the first and second terminals and the resonant circuit and a selected one of the N output terminals during the interval. The resonant circuit current is zero at the beginning and end of the interval. A capacitor shunting each of the output terminals has a value relative to the capacitance of the series resonant circuit such that the voltage across each output terminal remains approximately constant between adjacent exchanges of energy between the resonant circuit and the output terminal. The selective connection is in response to a comparison of the actual voltage across each of the N output terminals and a reference voltage for each of the N output terminals. The comparison controls when the flow of current between the selected first and second terminals and the selected output terminal via the resonant circuit begins. The frequency of the AC voltage developed across the N output terminals is much less than the resonant frequency of the circuit.

Despite these systems, there remains a need for an efficient, reliable variable speed energy conversion system.

SUMMARY OF THE INVENTION

The present invention relates to an electro-mechanical energy conversion system to selectively convert and transfer energy from an energy source to an energy load and an energy transfer multiplexer to selectively control the direction of power or energy flow through the energy transfer multiplexer to control the operation of the electro-mechanical energy conversion system.

The electro-mechanical energy conversion system may comprise a motor to drive a pump, fly wheel, or other such device or a generator to power an electrical power grid or an electrical load.

For example, the electro-mechanical energy conversion system of the present invention comprises a permanent magnet induction machine to convert wind energy into an electrical power output to a polyphase electric power grid operating at a system frequency comprising a variable speed generation system such as a turbine for converting the wind energy into mechanical energy and a generator coupled to the turbine to drive the rotor to create power in the stator to supply electrical power to the power grid. The generation system also includes control means for varying the rotor speed in response to the power output and the wind energy to increase the ratio of the electrical output power to the wind energy input.

The electro-mechanical energy conversion system operates at high efficiency regardless of variable resource conditions by controlling the rotor speed. Thus, the electro-mechanical energy conversion system can operate at substantially reduced rating. Thus, the equipment and operating costs are significantly lower than those of existing systems.

These and other objects, features and advantages of the present invention will become apparent to those skilled in the art from the following description and drawings.

BRIEF DESCRIPTION OF THE DRAWINGS

For a fuller understanding of the nature and object of the invention, reference should be had to the following detailed description taken in connection with the accompanying drawings in which:

FIG. 3A is a block diagram of the electro-mechanical energy conversion system of the present invention implemented with a doubly fed induction machine and mechanical energy source.

FIG. 3B is a block diagram of the electro mechanical energy conversion system of the present invention implemented with a permanent magnet generator or machine and mechanical energy source.

FIG. 11 shows the initial or starting polarity and the final polarity of the capacitor potential for the plurality of switches or control points of the energy transfer multiplexer or electro-mechanical energy conversion system of the present invention and the associated plurality of the differential voltage, $\Delta_O$ between the input $E_1$ and output $E_0$ potential.

FIG. 12 depicts various electrical charge states on the bi-directional resonant link of the energy transfer multiplexer or electro-mechanical energy conversion system of the present invention.

FIGS. 15 through 17A and 17B show the process of pre-charging the shuttle or resonant capacitor of the energy transfer multiplexer or electro-mechanical energy conversion system of the present invention.

FIG. 18 shows the energy transfer through the bi-directional resonant transfer link of the energy transfer multiplexer or electro-mechanical energy conversion system of the present invention where the current flow or charge transfer is from $E_1$ to $E_0$ (left to right) equation.

FIG. 19 shows the energy transfer through the bi-directional resonant transfer link of the energy transfer multiplexer or electro-mechanical energy conversion system of the present invention transferring energy from the load to the source and equation where the current flow or charge transfer is from $-E_0$ to $-E_1$ (right to left).

FIG. 20 continues and completes the family of equations deriving the quantity of current transferred between the rotor and stator of the electro-mechanical energy conversion system of the present invention.

Similar reference characters refer to similar parts throughout the several views of the drawings.

DETAILED DESCRIPTION OF THE PREFERRED EMBODIMENT

Figure 1A:
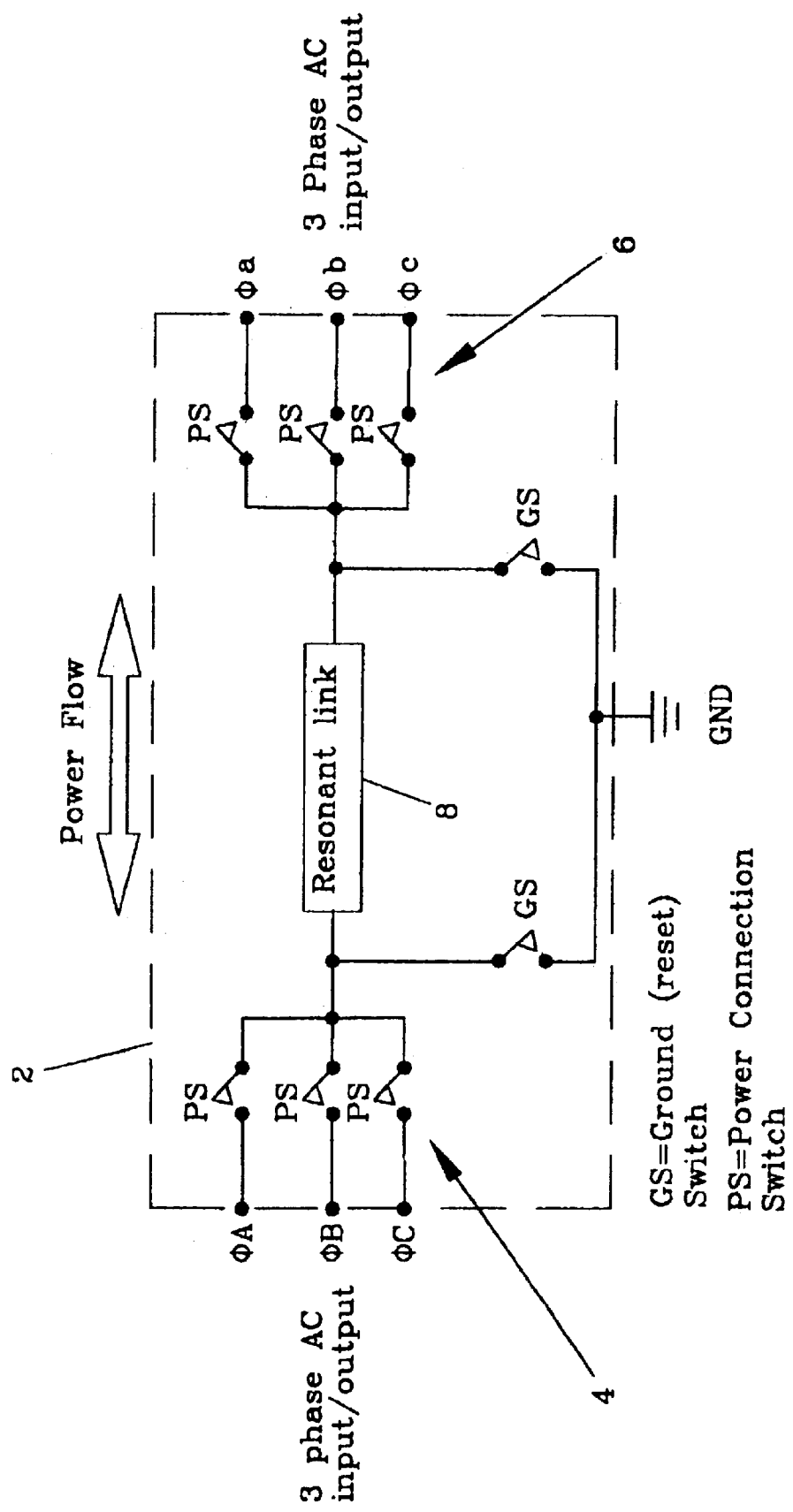
FIG. 1A is a block diagram of the energy transfer multiplexer of the present invention.

The present invention relates to an electro-mechanical energy conversion system including a permanent magnet induction machine to selectively convert and transfer energy from an energy source to an energy load and an energy transfer multiplexer to selectively control the flow of energy from an energy source to an energy load.

The electro-mechanical energy conversion system of the present invention may be configured to operate as a generator or motor. As a generator, the electro-mechanical energy conversion system can convert mechanical energy from wind turbines, hydro turbines, steam turbines, internal combustion engineers, fly wheels and the like to generate electrical energy to power an electrical power grid, rural power, electric boats, industrial pumps and the like.

The electrical energy can also be converted and stored in the form of hydrogen storage, batteries or compressed air for future use. Likewise, as a motor, the electro-mechanical energy conversion system can convert electrical energy from an electrical power source to power a wide range of mechanically driven or powered devices or systems such as electric boat drives, traction drives, pumps and fans. Of course, there is no known limit as to the application of the electro-mechanical energy conversion system either as a generator or motor.

The present invention can include a selectively controlled bi-directional inverter and an energy converter device comprising the permanent magnet induction machine to create a sinusoidal current source/sink.

When the electro-mechanical energy conversion system operates with a doubly fed induction generator, a variable frequency/amplifier 3 phase AC excitation current is fed to the rotor winding to generate a rotor electrical excitation frequency. Power is selectively fed to or from the rotor windings to transfer substantially constant frequency, constant amplitude power through the air gap to the stator windings. Specifically, rotor electrical excitation frequency is either added to or subtracted from the rotor mechanical (shaft speed): frequency to generate a substantial constant 3 phase AC power output on the stator winding.

Since the bi-directional inverter operates either as a sinusoidal current source or as a sinusoidal current sink, the electro-mechanical energy conversion system as described more fully hereinafter generates a sinusoidal current at the desired frequency or accepts a sinusoidal current at a given frequency thereby selectively transferring energy in either direction. This significantly expands the stability of the operating region of a doubly fed induction machine with a substantial 30% to 45% reduction in the required power level at the rotor winding as compared to equivalent pulse width modulation devices. This power reduction coupled with the reduction in the need for additional harmonic filtering reduces the cost of bi-directional compared to an equivalent PWM converter by about 1 cent per watt of delivered grid power; i.e. $30,000 for a $3 \times 10^6$ watt system. In other words, the increased stability of the induction machine and increased operating frequency range allows a lower converter maximum power level with attendant reduced costs.

In addition, by utilizing a bi-directional sinusoidal current, the increased stability coupled with the removal of the "PWM required" filter, improves on the design requirements for the mechanical components by reducing the number of components required or by decreasing the ratings of some of the components. The faster operating response improves the elasticity of the mechanical generator drive train. This increased compliance, coupled with sinusoidal current waveform reducing torque ripple prolongs the operating life of the various mechanical components.

Moreover, the increased stability on the system also permits a change in the gear ratio and therefore the rotor frequency band above and below the 60 Hertz operating point from ±20 Hertz to +32 Hertz, −8 Hertz. This reduces the required power level of the energy converter and permits additional mechanical power source capture and improved generator performance at the high frequency high power point. Thus the maximum mechanical power input occurs at 68 Hertz reduced from 80 Hertz associated with typical variable speed input energy sources. As a result, the present invention can be effectively implemented with a four pole configuration rather than a six pole configuration with an attendant reduction in generator cost of about 30%.

Further, this 12 Hertz or 720 revolutions per minute reduction in the rate of rotor rotation reduces not only the mechanical stress but also increases maximum power available from the generator.

These aspects of the present invention provide substantial design and operational flexibility with attendant fabrication and operating savings.

As shown in FIG. 1A, the energy transfer multiplexer comprising a bi-directional resonant inverter generally indicated as 2 including a first bank or plurality of switches or energy transfer control points generally indicated as 4 and a second bank or plurality of switches or energy transfer control points generally indicated as 6 operatively coupled by a series resonant transfer link generally indicated as 8 to selectively control the direction of power or energy flow between the first and second bank or plurality of switches or energy transfer control points 4 and 6 to control the operation of an electro-mechanical energy conversion system in response to a plurality of predetermined conditions or parameters as described more fully hereinafter. Although the operation of the energy transfer multiplexer 2 is described in association with the electro-mechanical conversion system 10, the energy transfer multiplexer 2 is useful in other applications.

Figure 1B:
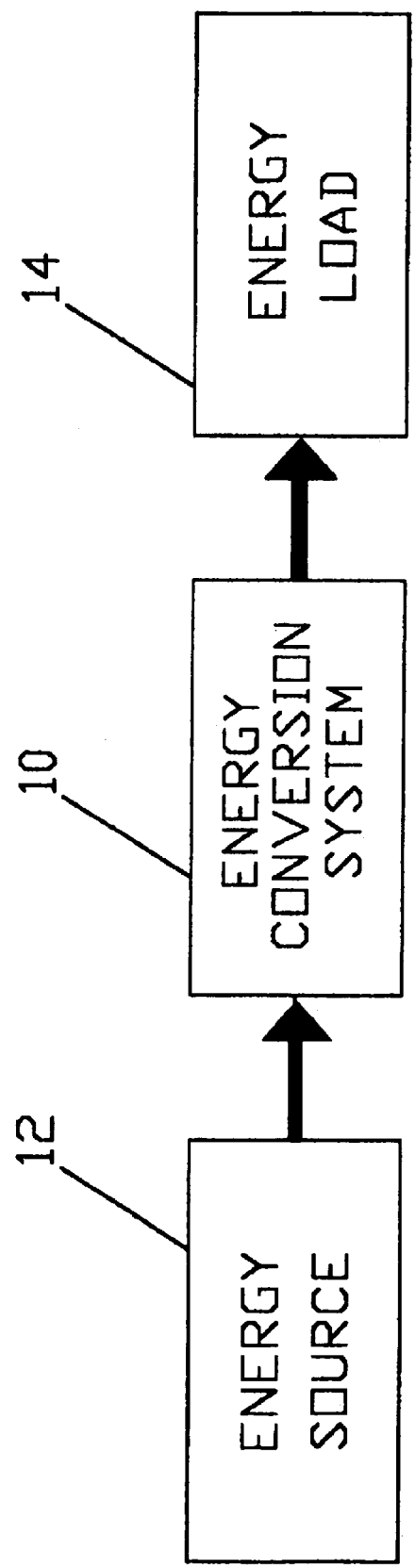
FIG. 1B is a block diagram of the electro-mechanical energy conversion system of the present invention.

As shown in FIG. 1B, the electro-mechanical energy conversion system 10 comprises an energy converter device such as a permanent magnet induction machine or doubly fed induction machine as described more fully hereinafter coupled between an energy source 12 and the energy load 14 to convert the energy from the energy source 12 and an transfer the converted energy to the energy load 14.

As shown in FIG. 3A, the electro-mechanical energy conversion system 10 comprises an energy converter device generally indicated as 16 coupled between the input energy source 12 and the output energy load 14 to convert the energy from the input energy source 12 from one form of energy to another and to transfer the converted energy to the output energy load 14 and an energy conversion and transfer control 18 to selectively control the energy converted from the input energy source 12 and transferred to the output energy load 14 in response to a plurality of predetermined conditions or parameters.

As shown in FIG. 3A, the energy converter device 16 includes an energy converter section or device 20 comprising a doubly fed induction machine having a rotor 22 and stator 24 to selectively convert the energy from the input energy source 12 and to selectively transfer the converted energy to the output energy load 14 and an energy transfer section or energy transfer multiplexer 26 coupled to the energy conversion section or device 20 comprising the doubly fed induction machine to selectively transfer energy between the rotor 22 and the stator 24 and to feed the converted energy to the output energy load 14 as described more fully hereinafter.

The energy conversion and transfer control or energy management system 18 comprises an energy converter control 28 to control the operation of the energy transfer device or energy transfer multiplexer 26 and a source/load control 30 to control the operation of the input energy source 12 and output energy load 14 with respect to the energy converter device 16.

FIG. 3A depicts the electro-mechanical energy conversion system 101 as generator with a wind turbine device as the input energy source 12. As described more fully hereinafter, since the wind turbine device is a variable speed energy source, the energy transfer device 26 and energy converter control 28 of the energy conversion and transfer control 18 control the electrical excitation of the windings of the rotor 22 of the doubly fed induction machine 20 to generate three phase power on the stator 24 matching the frequency of the three phase power of the stator 24 with the AC frequency of the output energy load 14.

FIG. 3B depicts the electro-mechanical energy conversion system 10 wherein the energy converter section or device 20 comprises a permanent magnet induction machine in place of the doubly fed induction machine 20 depicted in FIG. 3A. Otherwise, the various components of the electro-mechanical energy conversion system 10 are virtually the same.

Figure 3C:
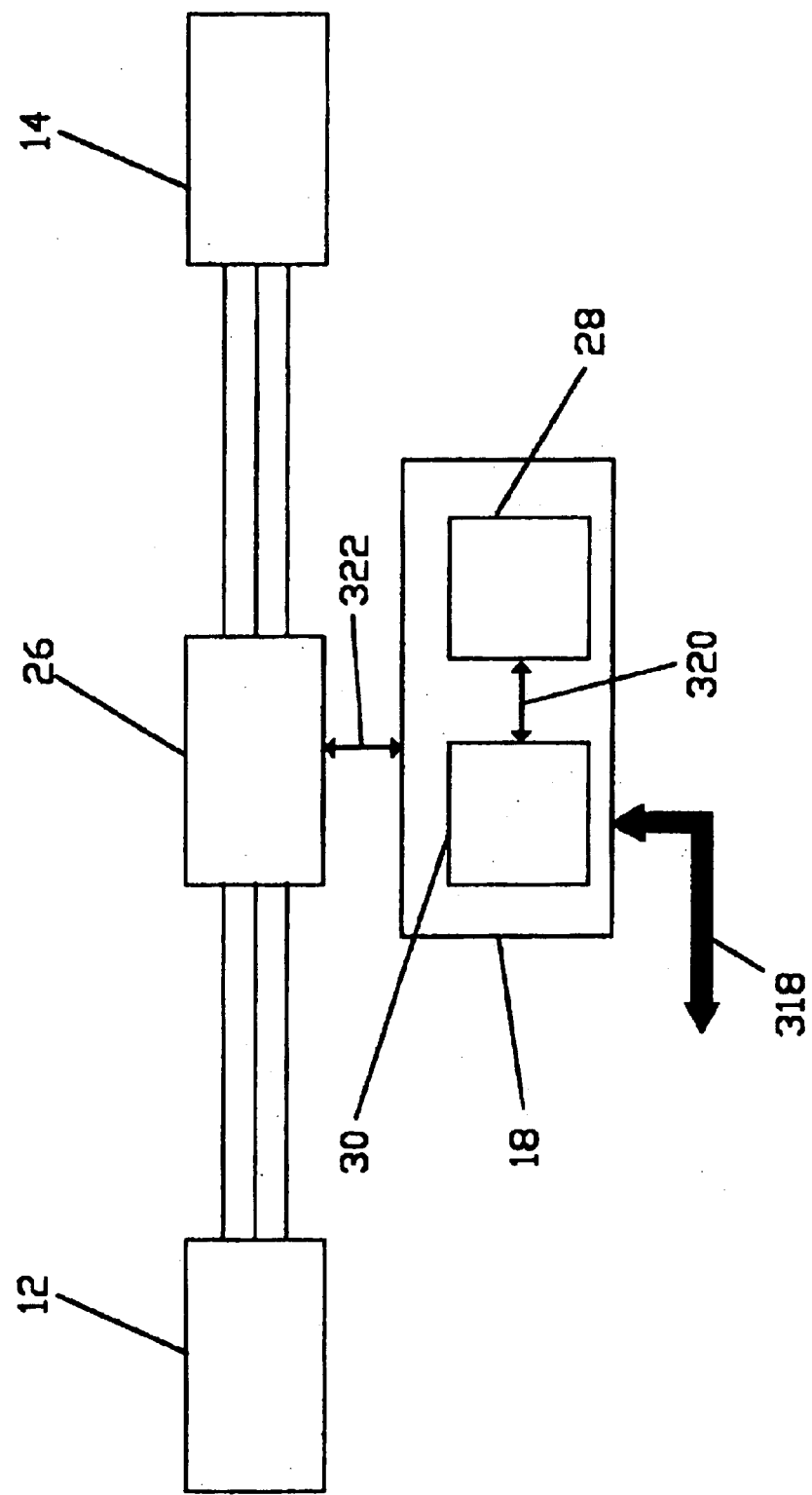
FIG. 3C is a block diagram of an electrical to electrical energy conversion system of the present invention.

FIG. 3C depicts an electrical to electrical energy conversion system 10 using electrical power as the input energy source 12. The energy transfer multi-plexer shown in FIGS. 3A, 3B and 3C respectively are similar in function and operation as described hereinafter FIGS. 4 through 7 show the energy transfer device or energy transfer multiplexer 26 implemented through the use of IGBT switches; while, FIG. 8 shows the energy transfer device 26 implemented through the use of SCR switches.

Figure 4:
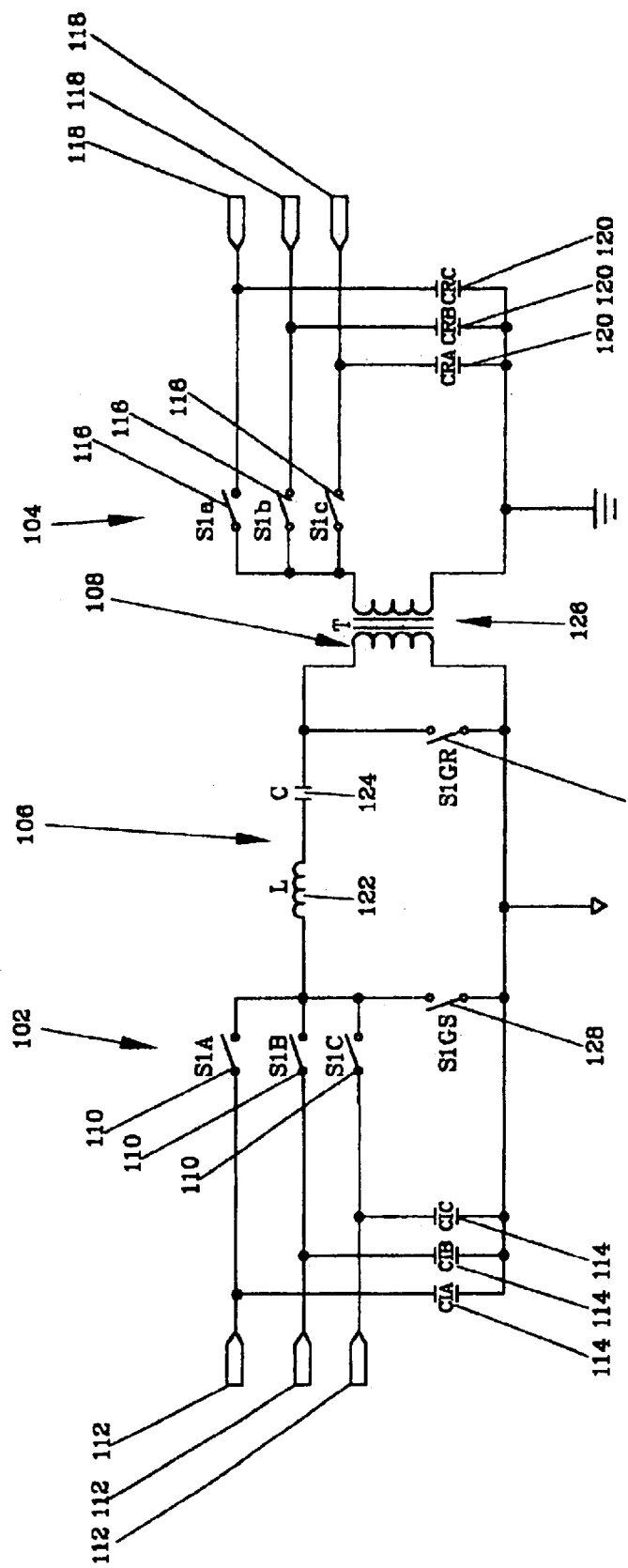
FIG. 4 is a topological schematic of the energy transfer multiplexer or energy transfer section of the electro-mechanical energy conversion system of the present invention implemented with IGBT switches.
Figure 5:
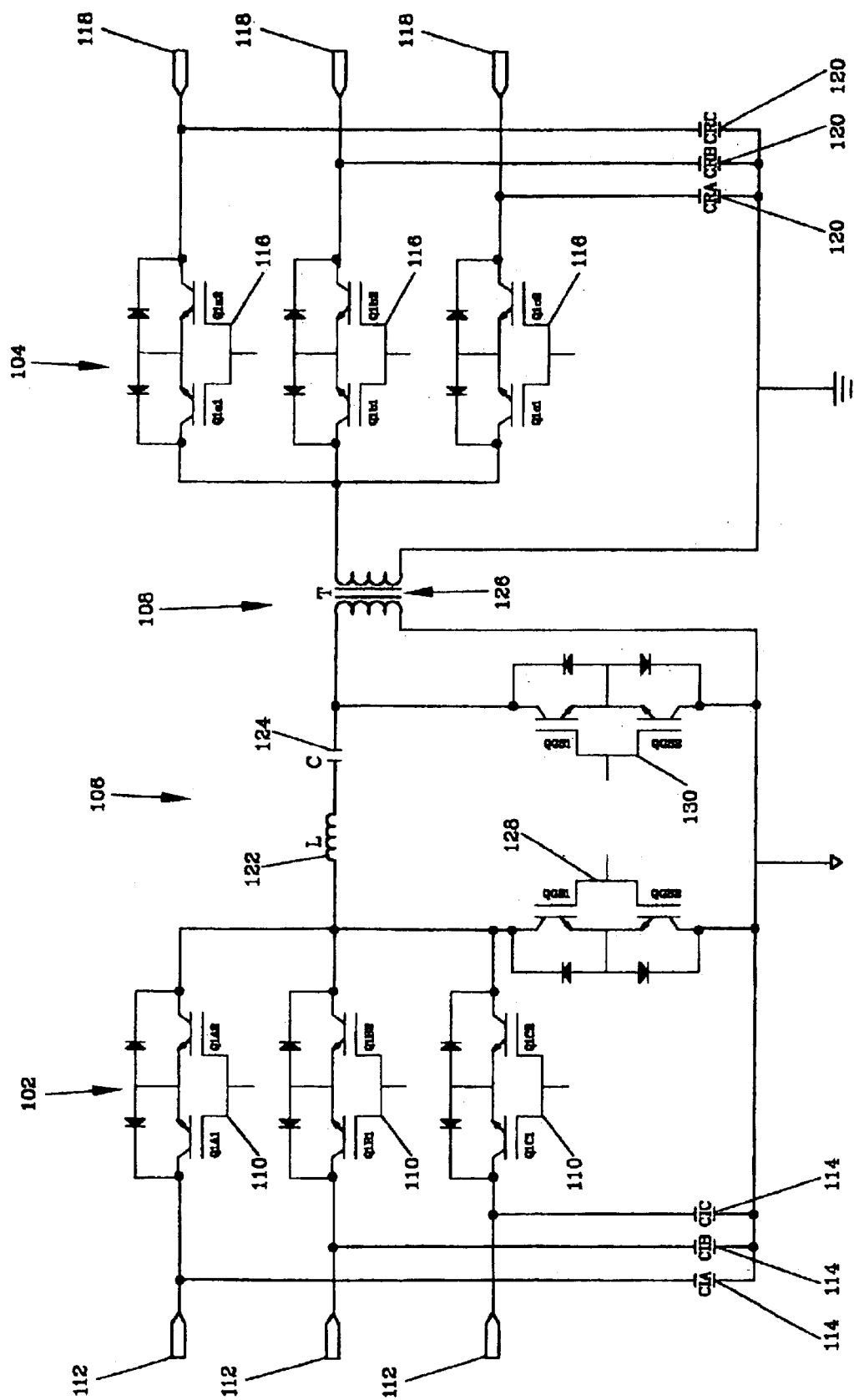
FIG. 5 is a circuit diagram of the energy transfer multiplexer or energy transfer section of the electro mechanical-energy conversion system of the present invention implemented with IGBT switches.

As best shown in FIGS. 4 and 5, the energy transfer device 26 comprises a plurality of rotor energy transfer control elements or switches generally indicated as 102 and a plurality of stator energy transfer control elements or switches generally indicated as 104 operatively coupled in energy transfer relationship by a bi-directional resonant transfer link generally indicated as 106 and an isolation element or component generally indicated as 108.

The energy transfer multiplexer 26 may include the isolation element or component 108 as shown in FIGS. 4 through 8 or may be implemented without the isolation element or component 108 are shown in FIG. 1A. For example, when the energy transfer multiplexer 26 is used with a doubly fed induction machine the rotor winding is already isolated from the stator winding obviating the necessity of an isolation transformer.

The plurality of rotor energy transfer control elements or switches 102 comprises an IGBT switch 110 coupled to each phase A, B, C of the rotor 22 of the doubly fed induction machine by a corresponding conductor or line 112 shunted to ground by a corresponding shunt capacitor 114. Similarly, the plurality of stator energy transfer control elements or switches 104 comprises an IGBT switch 116 coupled to each phase a, b, c of the stator 24 of the doubly fed induction machine 20 by a corresponding conductor or line 118 connected to corresponding slip rings 119 and shunted to ground by a corresponding shunt capacitor 120. The bi-directional resonant transfer link 106 comprises a series resonant inductor 122 and resonant capacitor 124; while, the isolation element or component 108 comprises a transformer generally indicated as 126 coupled between the bi-directional resonant transfer link 106 and the plurality of energy transfer control elements or switches 104.

The energy transfer device 26 further includes a first local ground energy transfer control element or switch 128 coupled or connected between one side of the resonant link 8 to ground and a second local ground energy transfer control element or switch 130 coupled or connected between the opposite side of the resonant link 8 and ground 12.

Figure 6:
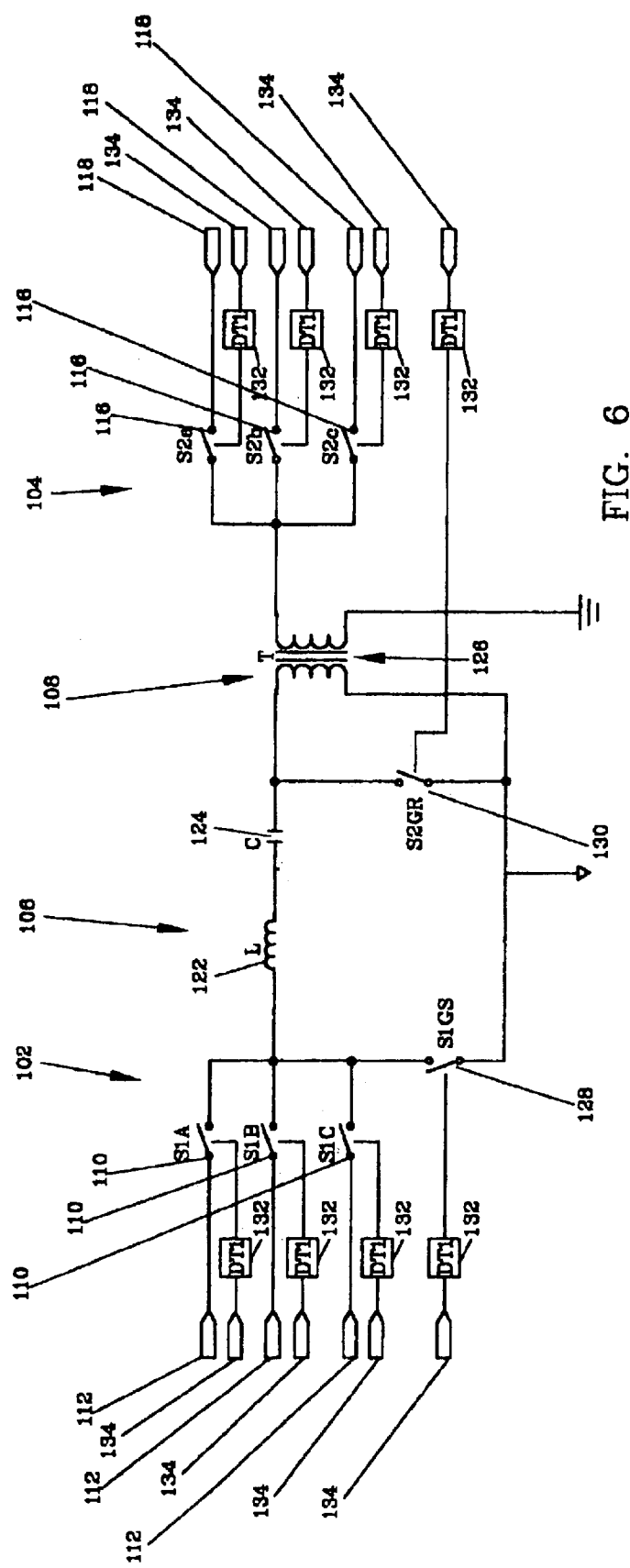
FIG. 6 is a schematic of the drivers or controlled power switches of the energy transfer section of the electro-mechanical energy conversion system of the present invention implemented with IGBT switches.
Figure 9:
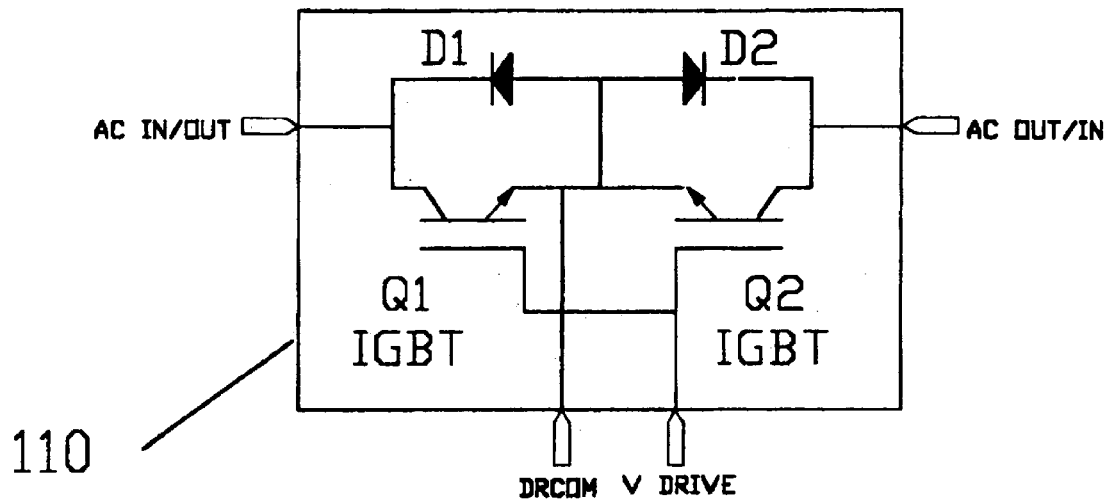
FIG. 9 shows an IGBT power switch or driver of the electro-mechanical energy conversion system of the present invention for the IGBT switches.
Figure 10:
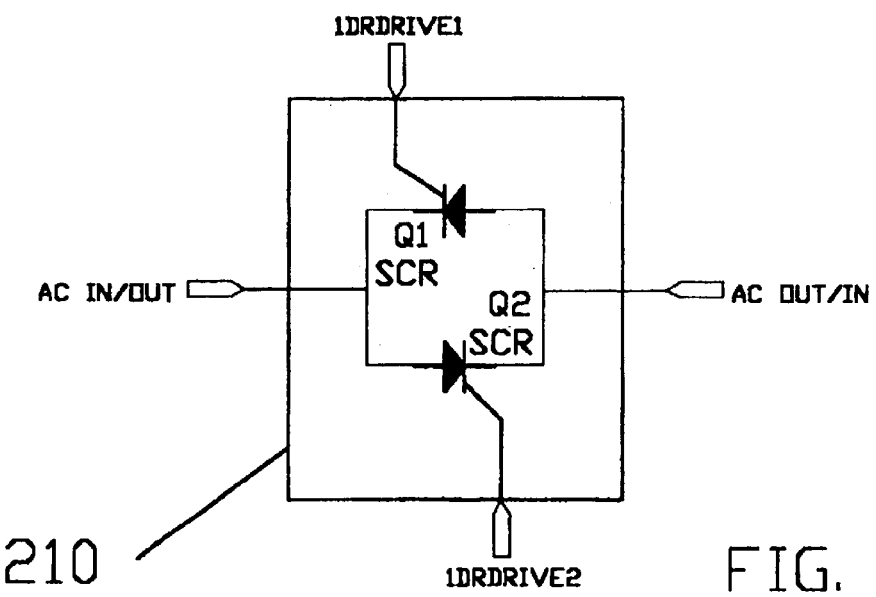
FIG. 10 shows a SCR power switch or driver of the electro-mechanical energy conversion system of the present invention for the SCR switches.

As shown in FIG. 6, the operation in energy transfer control elements or IGBT switches 110, 116, 128 and 130 are controlled by a corresponding driver 132 coupled to the energy conversion and transfer control 18 by a corresponding driver conductor or line 134. Energy transfer control elements or IGBT switches 110, 116, 128 and 130 and driver 132 connections are shown in detail in FIG. 9.

Figure 7:
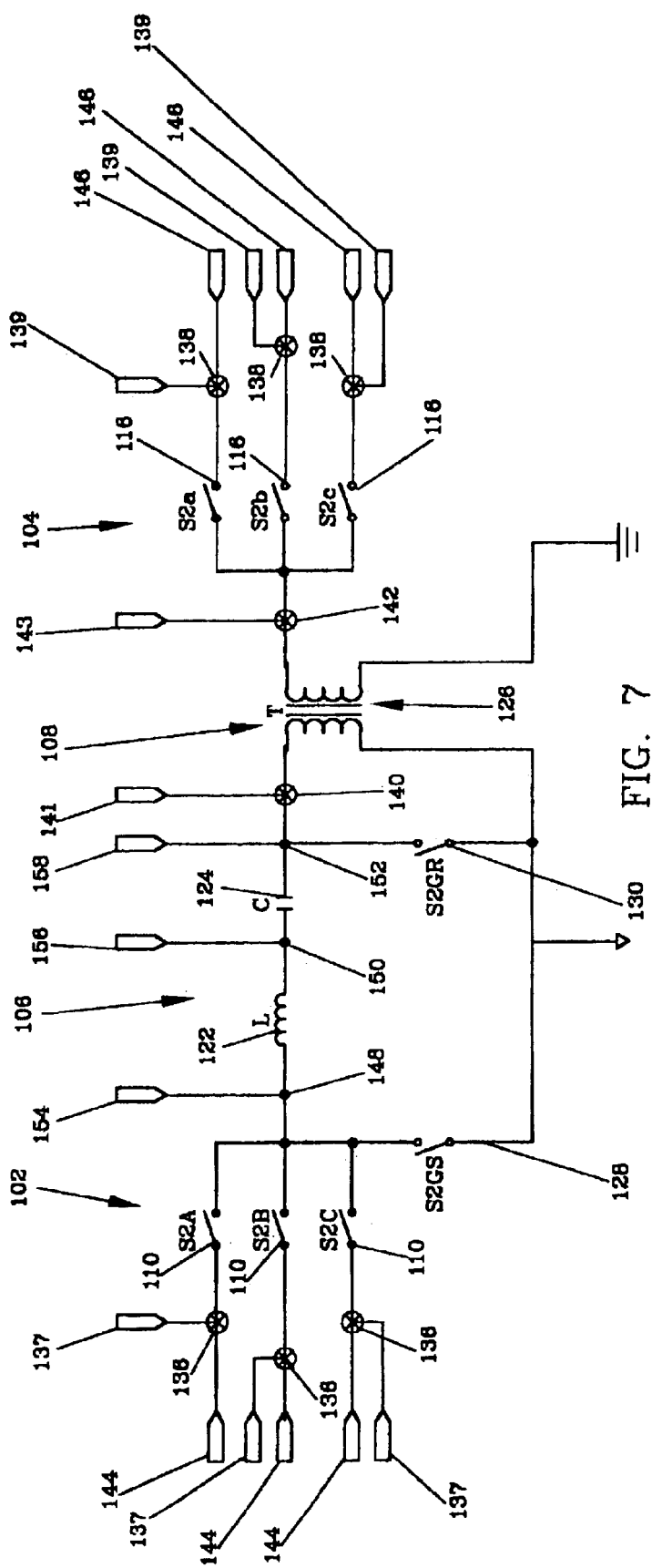
FIG. 7 is a schematic of the sensors of the energy transfer multiplexer or energy transfer section of the electro-mechanical energy conversion system of the present invention implemented with IGBT switches.
Figure 8:
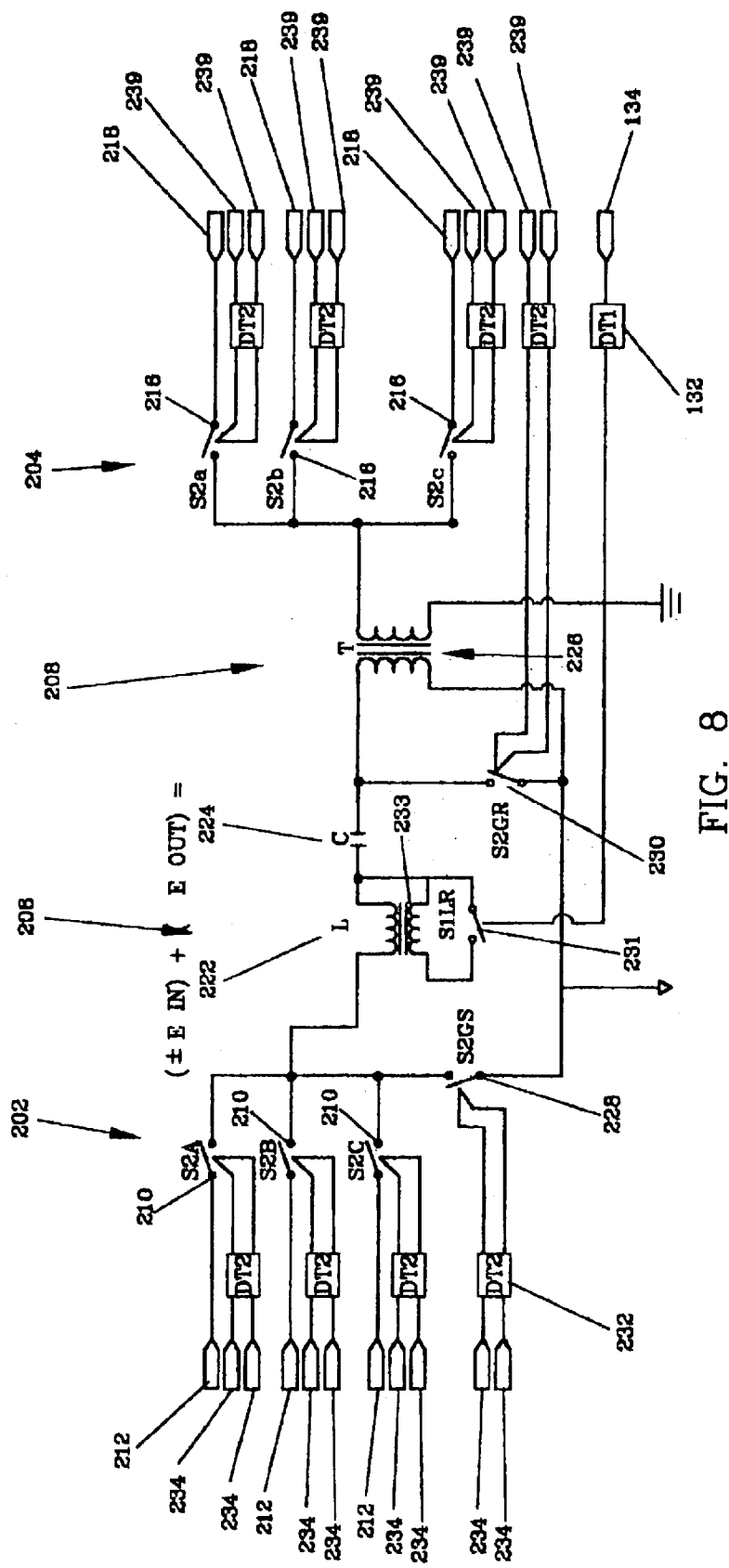
FIG. 8 is a schematic the drivers or controlled power switches of the energy transfer multiplexer or energy transfer section of the electro-mechanical energy conversion system of the present invention implemented with SCR switches.

FIG. 7 shows a plurality of operating parameters or condition sensors to sense and feed real time current and voltage values or data to the energy converter control 28 of the energy conversion and transfer control 18.

Specifically, the rotor phase current for each phase A, B, C of the rotor 22 of the doubly fed induction machine 20 is monitored or sensed at corresponding sensor point 136 on corresponding conductors or lines 112 and fed to the energy converter control 28 of the energy conversion and transfer control 18 by corresponding conductors or lines 137; while, the stator phase current for each phase a, b, c of the stator 24 of the doubly fed induction machine 20 are monitored or sensed by a corresponding current sensor 138 and fed to the energy converter control 28 of the energy conversion and transfer control 18 by corresponding conductors or lines 139. Current through the primary and secondary windings of the transformer 126 are monitored or sensed by at corresponding sensor points 140 and 142 respectively and fed to the energy converter control 28 of the energy conversion and transfer control 18 by corresponding conductors or lines 141 and 143 respectively. In the event no transformer 126 or isolation device is used, the line current is monitored or sensed.

The rotor phase voltage for each phase A, B, C of the rotor 22 of the doubly fed induction machine 20 is monitored or sensed at sensor points 138 on corresponding conductors or lines 112 and fed to the energy converter control 28 of the energy conversion and transfer control 18 by corresponding conductors or lines 144; while, the stator phase voltage for each phase a, b, c of the stator 24 of the induction machine 20 are monitored or sensed at corresponding sensor points 138 or equivalent on corresponding conductors or lines 118 and fed to the energy converter control 28 of the energy conversion and transfer control 18 by corresponding conductors or lines 146. The stator common voltage and the fundamental resonant capacitor voltages on opposite sides of the resonant choke 122 and the resonant capacitor 124 are monitored or sensed at corresponding sensor points 148, 150 and 152 respectively and fed to the energy converter control 28 of the energy conversion and transfer control 18 by corresponding conductors or lines 154, 156 and 158 respectively.

The energy transfer device 26 implemented with SCR switches is similar in topology, sensing and control. As shown in FIG. 8, the energy transfer device 26 using the SCR switches comprises a plurality of rotor energy transfer control elements or switches generally indicated as 202 and a plurality of stator energy transfer control elements or switches generally indicated as 204 operatively coupled in energy transfer relationship by a bi-directional resonant transfer link generally indicated as 206 and an isolation element or component generally indicated as 208. The plurality of rotor energy transfer control elements or switches 202 comprises an SCR switch 210 coupled to each phase A, B, C of the rotor 22 of the doubly fed induction machine 20 by a corresponding conductor or line 212 shunted to ground by a corresponding shunt capacitor (not shown). Similarly, the plurality of stator connected energy transfer control elements or switches 204 comprises an SCR switch 216 coupled to each phase a, b, c of the stator windings 24 of the doubly fed induction machine 20 by a corresponding conductor or line 218 shunted to ground by a corresponding shunt capacitor (not shown). The bi-directional resonant transfer link 206 comprises a series resonant inductor 222 and resonant capacitor 224; while, the isolation element or component 208 comprises a transformer generally indicated as 226 coupled between the bi-directional resonant transfer link 206 and the plurality of rotor energy transfer control elements or switches 204. The energy transfer device 26 further includes a first local ground energy transfer control element or switch 228 and a second local ground energy transfer control element or switch 230 coupled between ground and opposite sides of the bi-directional resonant transfer link 206. A reset control comprising an IGBT switch 231 coupled to the resonant inductor 222 by a secondary winding 233 is used to reset the SCR switches 210 and switch 216 as described more fully hereinafter.

As shown in FIG. 8, the operation of the SCR switch energy transfer inverter is controlled by the energy transfer control elements or SCR switches 210, 216, 228 and 230 and the commutating switch 231 are turned on by drivers 232 controlled through lines 234 from controller 28 and commutated off by the reset control IGBT switch 231 controlled by a corresponding driver 132 coupled to the controller 28 of the energy conversion and transfer control 18 by a corresponding driver conductor or line 134.

A plurality of operating parameters or condition sensors used to sense and feed real time current and voltage values or data to the energy converter control 28 of the energy conversion and transfer control 18 for the SCR switch implementation is virtually the same as that shown in FIG. 7 for the IGBT switches implementation except for the SCR reset switch 231 to reset the SCRs after each energy transfer.

As previously mentioned, the electro-mechanical energy conversion system 10 can operate with various prime movers as a generator. Such prime movers require resource energy adjustment means responsive to a controller signal for controlling or limiting the resource energy from the input energy source 12 to the stator 24 of the electro-mechanical energy conversion system 10. For example, a hydro turbine generally has a hydro inlet and gate means such as a gate for closing the hydro inlet in response to a gate position signal. Similarly, a steam turbine generally has variable position inlet gate valves that open and close to control the amount of steam received by the turbine. Wind turbines typically have adjustable blades with an adjustable pitch angle that is varied to control the force of the wind received by the turbine blades. Solar energy power generation systems generally have adjustable solar panels or mirrors, which may be adjusted to vary the angle of incidence of the solar rays on the panels or mirrors.

More particularly, when used with a hydro turbine, the resource energy adjustment comprises a gate means for dosing the hydro inlet of the hydro turbine in response to the turbine controller signal. The turbine controller signal comprises a gate position signal. A turbine efficiency maximizer means receives and processes the head sensor signal and the gate position signal to produce the hydro turbine efficiency output signal. U.S. Pat. No. 5,028,804 discloses such a generator control system. For a wind turbine, a turbine controller produces a wind turbine controller signal that comprises a blade pitch adjustment signal. A wind turbine including adjustable blade with variable pitch angles, the resource energy adjustment means comprising means for adjusting the pitch angle of the blades in response to the blade pitch adjustment signal. A wind turbine efficiency maximizer receives and processes the wind speed sensor signal and the blade pitch adjustment signal to produce a wind turbine efficiency output signal U.S. Pat. No. 6,137,187 shows such a variable speed wind turbine generator control system.

As previously stated, FIG. 3A depicts the implementation of the electro-mechanical energy conversion system 10 using wind power as the input energy source 12 to generate electrical energy transferred to an output energy load on grid 14. When operating as a wind powered generator, the input energy source 12 comprises a wind driven propeller 310 coupled to the rotor 22 through a gear assembly or other mechanical coupling mechanism 312 and an output shaft 314. As described hereinafter, the energy converter control 28 of the electro-mechanical energy conversion system 10 compensates for changing wind speed and direction to supply power to the output energy load or power grid 14 at a substantially constant 60 Hertz output from the stator 24. This is accomplished by electrically exciting the rotor windings such that the rotor mechanical frequency and rotor electrical excitation frequency are theoretically equal to substantially 60 Hertz. The resultant 60 Hertz energy or power on the rotor 22 is transferred across the air gap of the doubly fed induction machine 20 to the stator 24 to be supplied to the grid 14 at substantially 60 Hertz through a switch 316. While a three phase grid is shown, the electro-mechanical energy conversion system 10 may be implemented for use with a single phase load.

The operation of the energy transfer multiplexer 26 as described hereinafter with either a doubly fed induction machine or a permanent magnetic induction machine is essentially the same. However, as show in FIG. 3A, when used with a doubly fed induction machine, the energy transfer multiplexer 26 is coupled between the windings of the wound motor 22 and energy converter section or device 20 and the stator 24 of the energy converter section or device 20 and the energy load 14 to transfer energy bi-directionally through the energy transfer multiplexer 26 to compensate for variations in the input energy source 12 to create or generate a virtual rotor frequency of 60 Hertz. On the other hand, as shown in FIG. 3B, when used with a permanent magnetic induction machine, the energy transfer multiplexer 26, isolated from the energy source 12, is coupled between the stator 24 of the energy converter section or device 20 (permanent magnet) and the load 14 to transfer the variable energy supply from the energy source 12 through the rotor 22 and stator 24 of the energy converter section or device 20 to the load. The energy transfer multiplexer 26 receives variable frequency energy signals from the stator 24 and compensates for these varying frequency energy signals to feed a substantially constant frequency of 60 Hertz. In short, in the doubly fed induction machine, the input or output frequency of the rotor windings or the rotor 22 of the energy transfer multiplexer 26 is variable and the output frequency of the stator 24 of the energy converter section or device 20 is substantially constant. In comparison, in the permanent magnet induction machine, the output frequency of the stator 24 of the energy converter section of device 20 fed to the energy transfer multiplexer 26 is variable; while the output for the energy transfer multiplexer 26 fed to the energy load 14 is substantially constant.

The energy transfer multiplexer 26, when used to control a variable speed permanent magnetic generator, has numerous operational and cost advantages.

Specifically, a permanent magnetic generator powered by a wind turbine at variable rotational speed outputs electrical energy with a sinusoidal wave form that varies in both frequency and voltage amplitude. Accordingly, for a 3 phase permanent magnetic generator, the energy transfer multiplexer electrical configuration has four input switches, 3 phase switches and an input ground switch, connected through a series resonant circuit to four output phase switches, 3 output switches and an output ground switch. Operation of the input phase switch in conjunction with the output ground switch allows the energy transfer multiplexer to function as a "charge pump" thereby allowing electrical charge to be transferred from a lower voltage to a higher voltage.

In contrast, pulse width modulation requires massive, expensive, low frequency DC inductors to obtain significant voltage gain.

Another advantage is the ability to actively, selectively and simultaneous control both the input and output power factor.

The energy transfer multiplexer selectively controls the four input and four output switches to allow varying size packets of charge to be transferred from the variable time varying input phase voltage to the variable time varying output phases. Accordingly, greater current flow for leading power factor or smaller current flow for lagging power factor can be obtained at a given value voltage of the AC waveforms.

In addition, the energy transfer multiplexer 26 is a bi-directional power flow allowing wind turbines to spin-up or start at very low wind speed by transferring power from the 3 phase grid to the permanent magnet generator as a permanent magnet motor.

The energy transfer multiplexer 26 is a symmetrical network that selectively processes power flow in either direction.

An advantage of electro-mechanical energy conversion system 10 with the energy transfer multiplexer 26 as opposed to pulse width modulation (PWM) power conversion, for wind turbines for both permanent magnet generators and doubly fed wound rotor machines is the large system bandwidth. The energy transfer multiplexer allows direct AC to AC conversion without utilizing an intermediate DC link; the benefits of energy transfer multiplexer resonant link for direct AC to AC conversion without a DC link include:

- System soft-start with current in rush control, when the permanent magnet machine is operating as a generator or as a motor.
- Very low windspeed start-up because of the energy transfer multiplexer property of variable voltage gain
- The energy transfer multiplexer symmetrical configuration allows the permanent magnet generator to spin-up the windturbine at zero windspeed utilizing the grid power.
- Rapid transient response allowing improved system stability; energy transfer multiplexer does not require high current-low frequency chokes that cause time delay in the in the system response.
- Rapid, almost instantaneous, shut-down because both the input and output phase switches are opened after each charge transfer at zero current and if not reclosed constitute an automatic shutdown.
- Improved system compliance because as the rapid transient response, soft-start and substantially instantaneous shut-down.

Finally, the compact design of permanent magnet generators allows relatively higher speed operation. The AC to DC rectification required for the PWM DC link is limited by inductance at high power levels at higher generator frequencies. With no requirement for a DC link, energy transfer multiplexers samples the AC sinusoidal wafeform with discrete small-duration (typically 20 ms–40 ms) time intervals that with optimum phase to ground by pass capacitors allow the generator to, operate with low distortion sinusoidal current and voltage waveforms at near unity power factor.

The eight switch symmetrical (4 switch resonant link) configuration includes a maximum of power processing system functionality; high gain, high bandwidth, high frequency, high efficiency, bi-directional power processing with soft-start, rapid shut-down and dual PF control. Further, the energy transfer multiplexer low distortion sinusoidal waveform operation inherently minimizes EMI, physical size and weight because unlike PWM, large high current low frequency DC magnetic filters are not required in energy transfer multiplexer power processors. Lastly, the energy transfer multiplexer symmetrical 8-switch power network, operating by transferring individual packets of electrical charge, represents a digitally controlled generic power processor applicable to all types of rotating electromagnetic machines.

In summary, a comparison of pulse width modulation and energy transfer multiplexer configurations and operating parameters shows that the solid state components, semiconductors and diodes, with other electrostatic and resistive components are roughly equivalent. Even the heat sinks (efficiency) and wiring requirements are about the same complexity. The unique advantage of energy transfer multiplexer in wind turbine power processing relates to:

size—energy transfer multiplexer do not require large expensive robust magnetic filters;

weight—no magnetic filters;

performance
   a) high speed more compact generator,
   b) low windspeed power through-put (constant conversion efficiency)
   c) broad speed (operational frequency) range with sufficient voltage gain at the lower end of the frequency range soft-start;

rapid shut-down, no stored energy wide bandwidth, transient control

For wind turbines with permanent magnet generator energy transfer multiplexer, the reduction in annual cost of power (a function of annual average wind speed) may be 10% to 40%.

For wind turbines with DFIM (large turgines) with energy transfer multiplexer, the initial cost of the power electronics is calculated to be reduced by 20% to 50% relative to pulse width modulation implementation.

As described in U.S. Pat. No. 6,137,187, various operating parameters or conditions associated with the input energy source 12 such as wind conditions, blade pitch, blade rotational speed and torque may be supplied to or calculated by the source/load control 30 to control the operation of the mechanical input such as blade pitch through feed back loops depicted generally as 318. Control signals and sensor signals are fed between energy converter control 28 and source/load control 30 through cable or lines 320 and between energy transfer device 26 and energy converter control 28 through cables or lines 322.

The energy converter control 28 controls the operation of the energy transfer device 26 to maintain the effective frequency of the rotor 22, mechanical frequency plus or minus winding excitation frequency, at substantially 60 Hertz through the operation of the bi-directional resonant transfer link 106 by selecting the switching states of the rotor energy transfer control elements or IGBT switches 102 or SCR switches 202 and the stator energy transfer control elements or IGBT switches 104 or SCR switches 204 to control the transfer of excitation energy to and from the rotor windings.

The switching states of IGBT switches 110, 116, 128 and 130 or SCR switches 210, 216, 118 and 230 and IGBT switch 231 of the corresponding energy transfer device 26 are selectively controlled by the converter transfer control logic of the micro-controller or microprocessor in the energy converter control 28 of the energy conversion and transfer control 18 to adjust excitation of the rotor windings of the doubly fed induction machine 20 through three phase slip rings generally indicated as 324 to compensate for changes or variations in the mechanical input conditions such as frequency and power level.

The various system currents and voltages previously described are sensed and fed to the energy converter control 28. At the same time, the mechanical rotor speed or rotational rate is measured. If the mechanical rotor speed or rotational rate is substantially 60 Hertz, power or excitation energy is neither added to nor subtracted from the rotor windings. However, if the mechanical rotor speed or rotation rate is greater than or less than substantially 60 Hertz, power or excitation energy is subtracted from or added to the rotor windings.

Figure 2A:
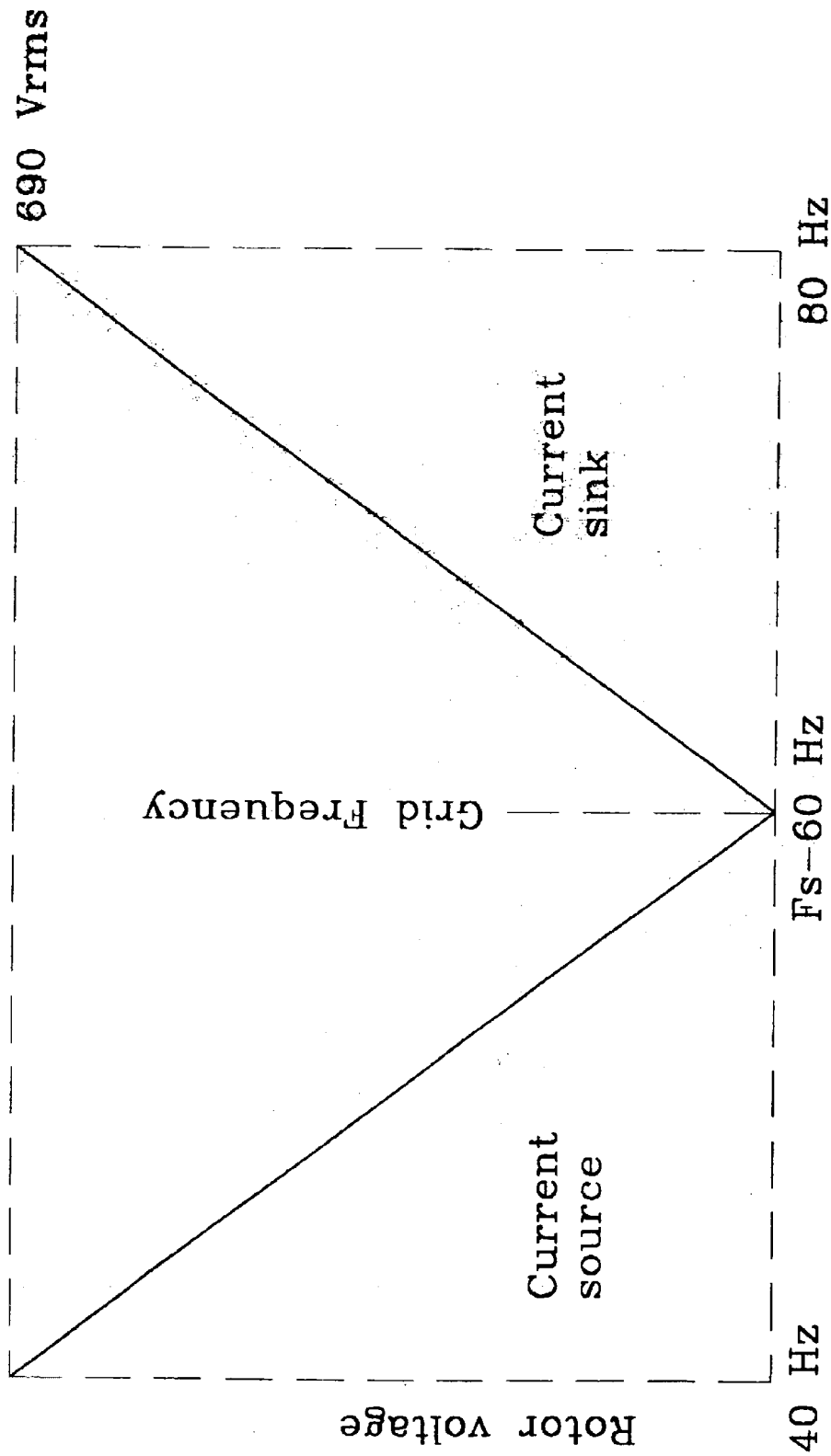
FIG. 2A is a rotor voltage/rotor frequency curve for the electro-mechanical energy conversion system for the present invention controlling a doubly fed induction machine.

As shown in FIG. 2A, when the mechanical rotor speed or rotation rate of the rotor 22 is greater than substantially 60 Hertz, the doubly fed induction machine 20 operates as a current sink drawing power from the rotor windings to compensate for the mechanical rotation over-speed of the rotor 22 to generate a magnetic stator (output) frequency of substantially 60 Hertz; the mechanical rotor speed (frequency) less rotor winding excitation frequency at the correct corresponding voltage, amplitude form a straight line curve shown on the right side of FIG. 2A. Conversely, when the mechanical rotor speed or rotational rate of the rotor 22 is less than substantially 60 Hertz, the doubly fed induction machine 20 requires as a current source feeding power into the rotor winding to compensate for the mechanical rotational under-speed of the rotor 22 to create a effective rotor speed (frequency) of substantially 60 Hertz; the mechanical rotor speed (frequency) plus rotor winding excitation magnetic frequency, at the corresponding voltage amplitude, also form the straight line phase curve shown on the left of FIG. 2A.

Figure 2B:
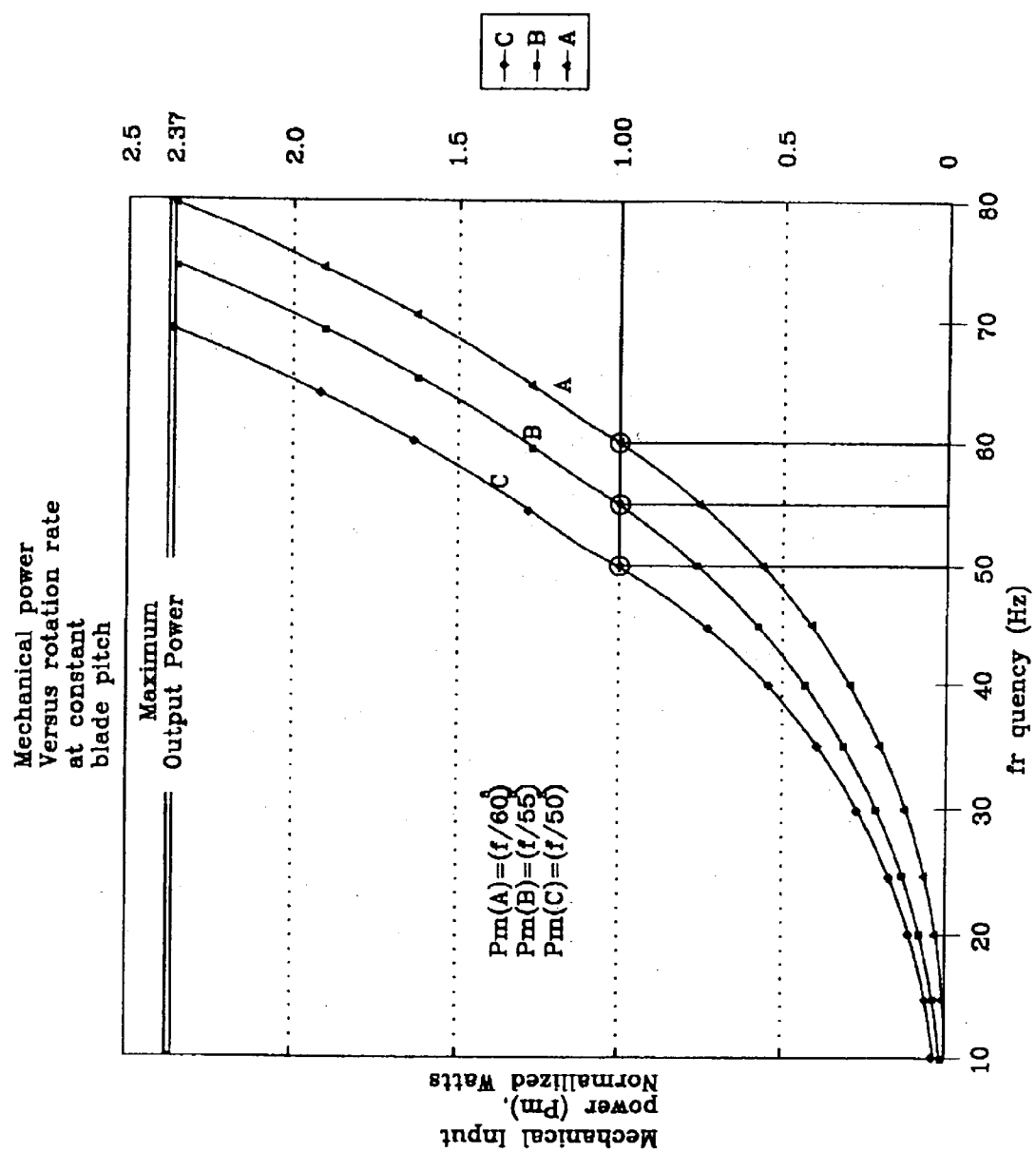
FIG. 2B is a mechanical input power/rotation rate curve for the electro-mechanical energy conversion system of the present invention controlling a doubly fed induction machine.
Figure 2C:
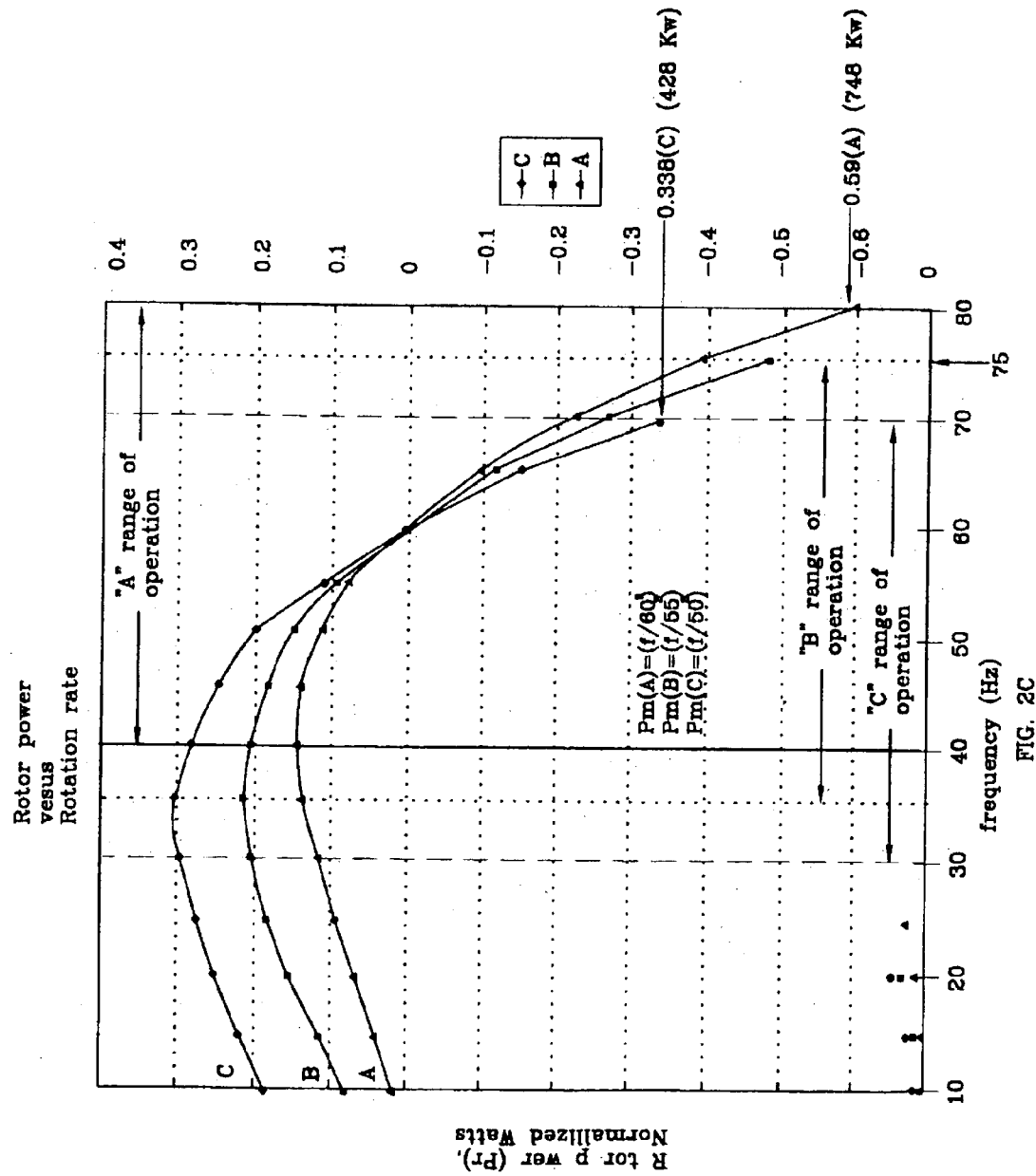
FIG. 2C is a rotor power/rotation rate curve for the electro-mechanical energy conversion system of the present invention controlling a doubly fed induction machine.

The micro-controller or microprocessor of the energy converter control 28 generates reference curves corresponding to the compensating rotor pulse repetition frequency and corresponding power amplitude of the power transferred between the rotor 22 and stator 24 to maintain the effective rotational rate of the rotor 22 at substantially 60 Hertz. The electro-mechanical energy conversion system power output is shown in FIGS. 2B and 2C.

FIG. 11 shows the various possible switching configurations of the rotor switches 102 or 202 and the stator switches 104 or 204. Specifically, any one of the three phase rotor switches 110 or 210 or the first ground switch 128 or 228 can be closed or actuated at the same time with any one of the stator switches 116 or 216 or the second ground energy transfer control element or switch 130 or 230 to control the transfer energy between the rotor 22 and the stator 24 as represented in FIG. 12.

Figure 14:
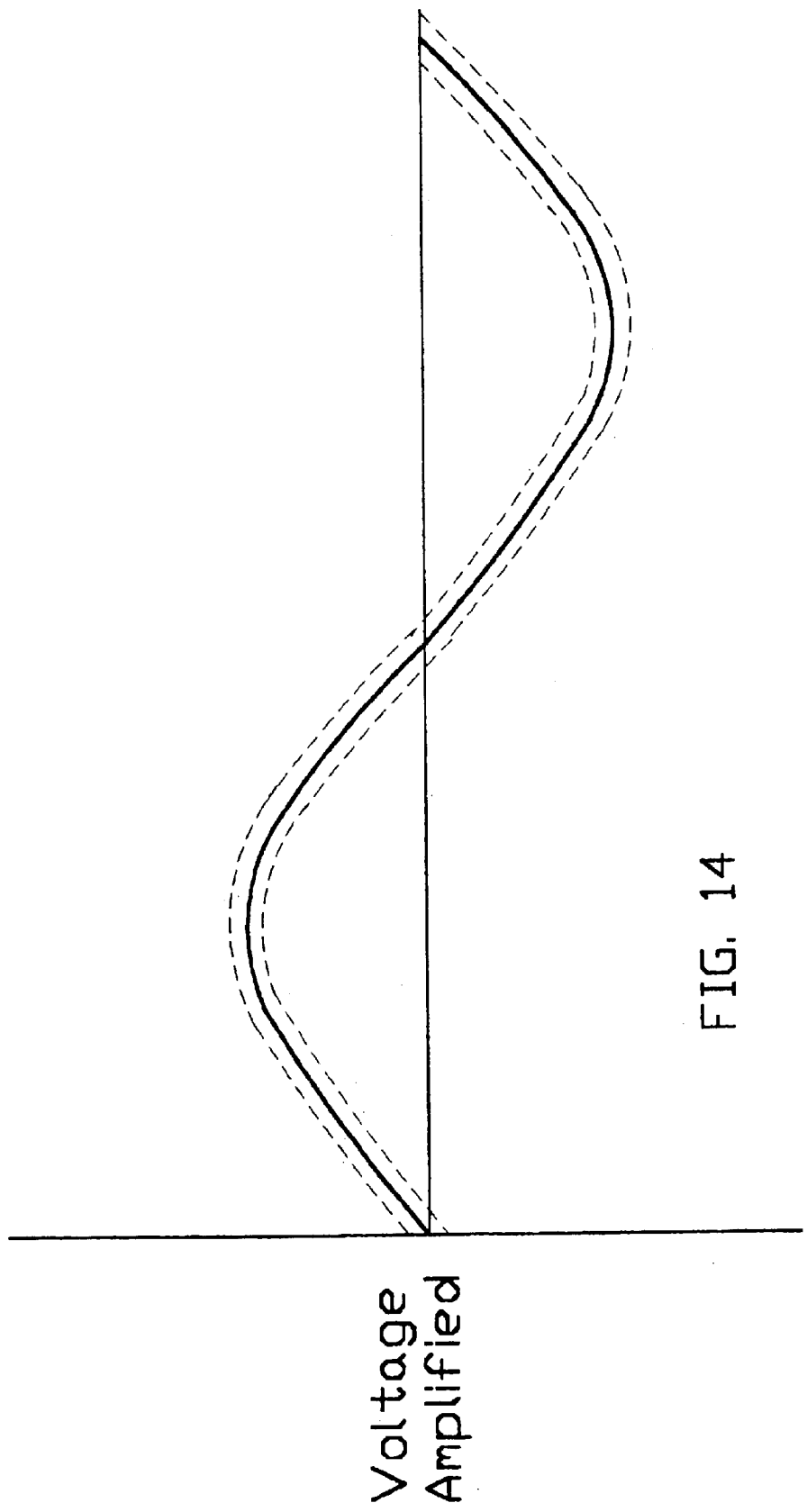
FIG. 14 shows a sinusoidal energy reference curve of the electro-mechanical energy conversion system of the present invention.

As stated, the microprocessor or micro-controller of the electro-mechanical energy conversion system 10 generates a reference curve or sine wave for each phase of the doubly fed induction machine 20 as shown in FIG. 14 in accordance with the substantially linear relationship between the mechanical rotor speed or frequency and voltage or amplitude of the energy converter device 16 whether operating as a current source, 40 Hertz to 60 Hertz, or a current sink, 60 Hertz to 80 Hertz as shown in FIG. 2A. The various values of the stator and rotor currents and voltages are sensed and fed to the micro-controller. The capacitor voltage are also sensed and fed to the microprocessor. These operating parameters or conditions are compared with reference appropriate curve dictated by the mechanical rotor speed and grid power demands to generate control signals to control drivers to actuate or enable switches 102 and 104 or 202 and 204. In addition, the SCRs are self commutative by the reset control IGBT switch 231.

Figure 13:
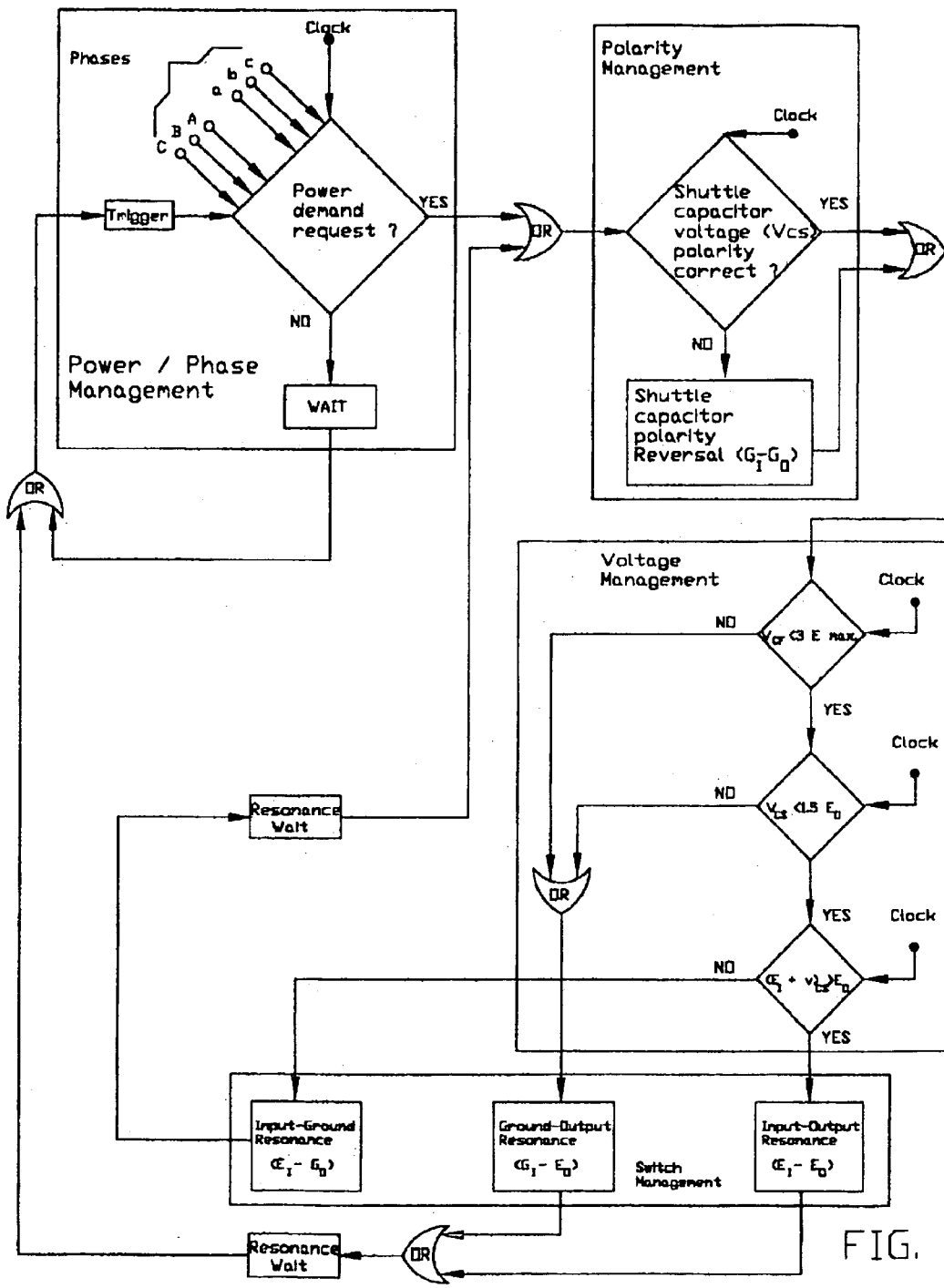
FIG. 13 shows the informational or decision flow and control logic for switching states of the first and second plurality of switches or energy transfer control points of the energy transfer multiplexer or electro-mechanical energy conversion system of the present invention.

The energy management system of the present invention comprises the energy transfer multiplexer 2 coupled to the energy source 12 to receive energy therefrom and to the energy load 14 to feed energy thereto and a system control coupled to the energy transfer multiplexer 2 to control the flow power to the energy load 14. As previously described, the energy transfer multiplexer 2 power comprises the first plurality of switches or control points 4 coupled to the energy source 12 to receive energy therefrom and a second plurality of switches or control points 6 coupled to the energy load 14 to feed energy thereto coupled by the resonant link 8 to transfer unrectified A/C signals therebetween and the system control comprising the plurality of sensors to monitor operating conditions of the signal processing to control the operation of the energy transfer multiplexer in response to the operating conditions wherein the plurality of sensors coupled between the logic section and the first plurality of switches or control points, the second plurality of switches or control points and the resonant link to sense the voltage levels of each of the first plurality of switches or control points and each of the second plurality of switches or control points and the voltage level across the capacitor and to generate voltage level signals corresponding to each voltage level and to feed the voltage level signals corresponding to each voltage level and to feed the voltage level signals to the logic section for processing and generate control signals fed to the switches or control points or sites as shown in FIG. 13. The entire signal processing and signal generation is time dependent.

The energy management system or signal processing section comprises power/phase management section, a polarity management section, a voltage management section and a switch management section to receive operating voltage signals, compare the operating voltage signals with predetermined voltage references and generate control signals when the operating voltage signals exceed the predetermined voltage reference to control the transfer of energy through the energy transfer multiplexer 26.

Specifically, the voltage for each switch 110 and 116 or 210 and 216 is sampled or interrogated to determine whether or not potential for phase A, B, C on the rotor 22 and for phase a, b, c on the stator 24 are within a predetermined range or band on either side of the appropriate voltage reference curve exemplified in FIG. 14. The actual voltages measured as the various phases are compared in the power/phase management section to determine if the corresponding phase voltage is within the predetermined reference-band. If-so, no-power is transferred into or out of the rotor 22 for the time increment and phase sampled.

The operation of the energy transfer multiplexer 26 as depicted in FIGS. 4 and 8, is best understood with reference to FIG. 13. In particular, if energy transfer is required, the polarity of charge across the resonant capacitor 124, 224 is sensed by polarity management section and corrected or reversed if necessary. To correct the polarity of the charge on the resonant capacitor 124, 224, if necessary, both sides of the resonant link 106/206 are connected or coupled simultaneously to local ground by the first ground switch 128/228 and second ground energy transfer control element or switch 130/230 for one-half cycle of the resonant frequency. With the correct polarity for the output phase connection request, the resonant capacitor 124, 224 is connected between the selected input switch 110, 210 phase A,B,C, or ground switch 128, 228 and the selected output switch 116, 216 on phase a,b,c.

The voltage management section calculates and compares the final change $V_{CF}$ on the resonant capacitor 124/224 with a first predetermined voltage value such as three times the capacitor break down voltage $3 E_{MAX}$ if the final charge $V_{CF}$ is equal to or greater than the first predetermined voltage, then the resonant link 106/206 is connected to ground through ground switch 128/228 and to the selected phase switch 116/216 (indicated on FIG. 13 as $G_I\text{-}E_O$) to discharge the stored energy on resonant capacitors 124/224 to provide a safety margin to prevent the voltage across the resonant capacitor 124/224 from exceeding the breakdown voltage. If the final charge $V_{CF}$ is less than the first predetermined, the initial charge $V_{cs}$ on the resonant capacitor 124/224 is compared to a second predetermined voltage value such as 1.5 times the output voltage $E_O$. If the initial charge $V_{CS}$ is equal to or greater than the second predetermined voltage, then the resonant link 106/206 is connected to ground though ground switch 128/228 and the selected output phase switch 116/216 (FIG. 13 as $G_I\text{-}E_O$). If the initial charge $V_{CS}$ is less than the second predetermined voltage, the sum of the selected input voltage $E_I$ and the initial charge $V_{CS}$ is compared to the output voltage $E_O$. If the sum of the input voltage $E_I$ and initial charge $V_{CS}$ is equal to or less than the output voltage $E_O$, then the resonant link 116/216 is connected between selected input switch 110/210 and ground switch 130/230 to increase the entire charge $V_{CS}$. If the sum of the input voltage $E_I$ and initial charge $V_{CS}$ is greater than the output voltage $E_O$, then the resonant link 116/216 is connected between $E_I$ and $E_O$ to complete the energy transfer between the energy source 12 and the energy load 14.

The switch management section generates output for resonance wait or delay time.

In other words, with the correct polarity across the resonant capacitor 124/224, when the $V_{CF}$ is less than a predetermined multiple of $E_{MAX}$ and $V_{CS}$ is less than a predetermined multiple of $E_O$ and the sum of $E_I$ and $V_C$ is greater than $E_O$, the poled input phase $E_I$ supplies power or energy to the poled output phase $E_O$ by closing the corresponding switches; the resonance wait or delay time is to allow time for the resonant transfer before re-triggering the system.

Figure 15:
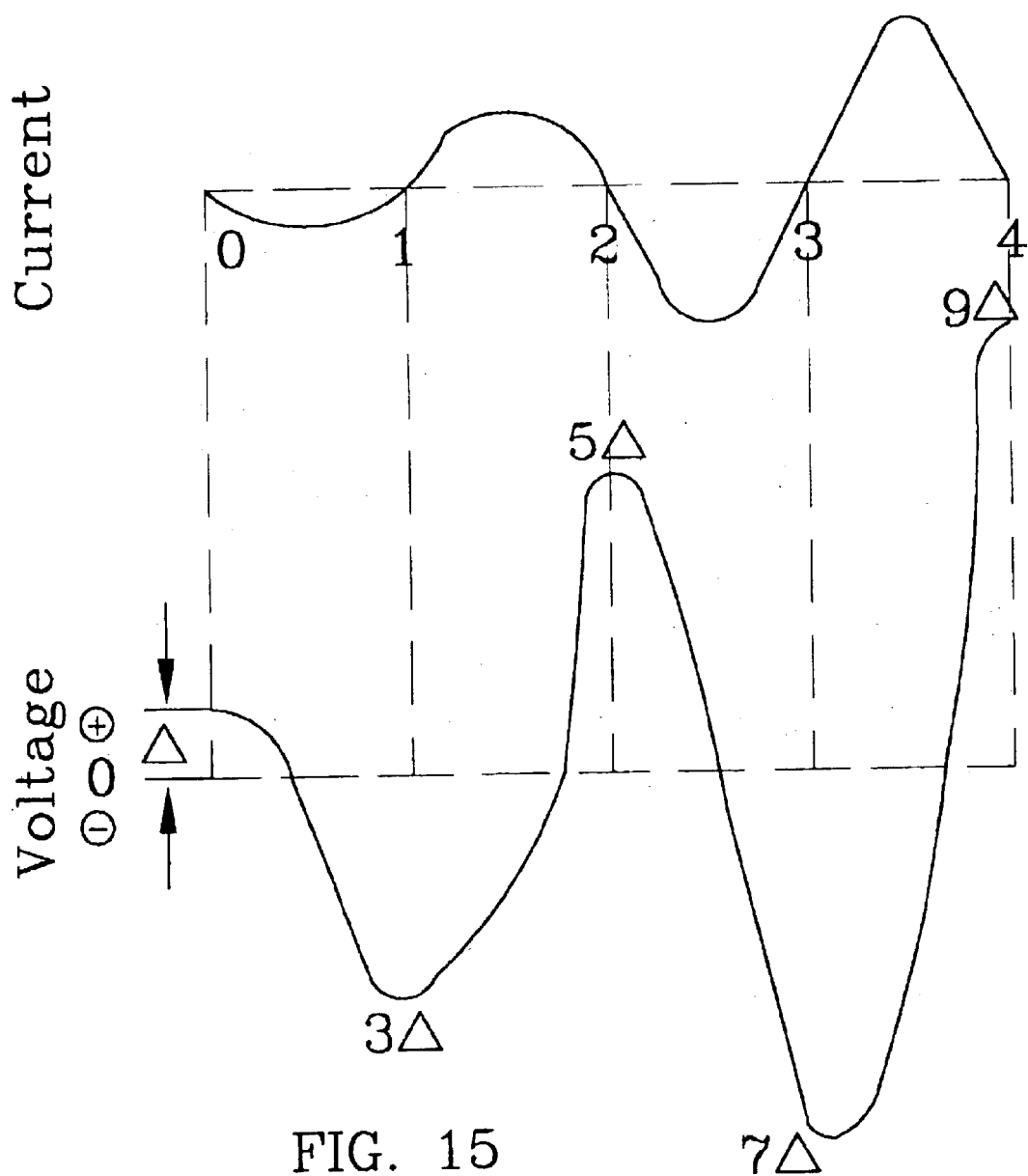
Figure 16A:
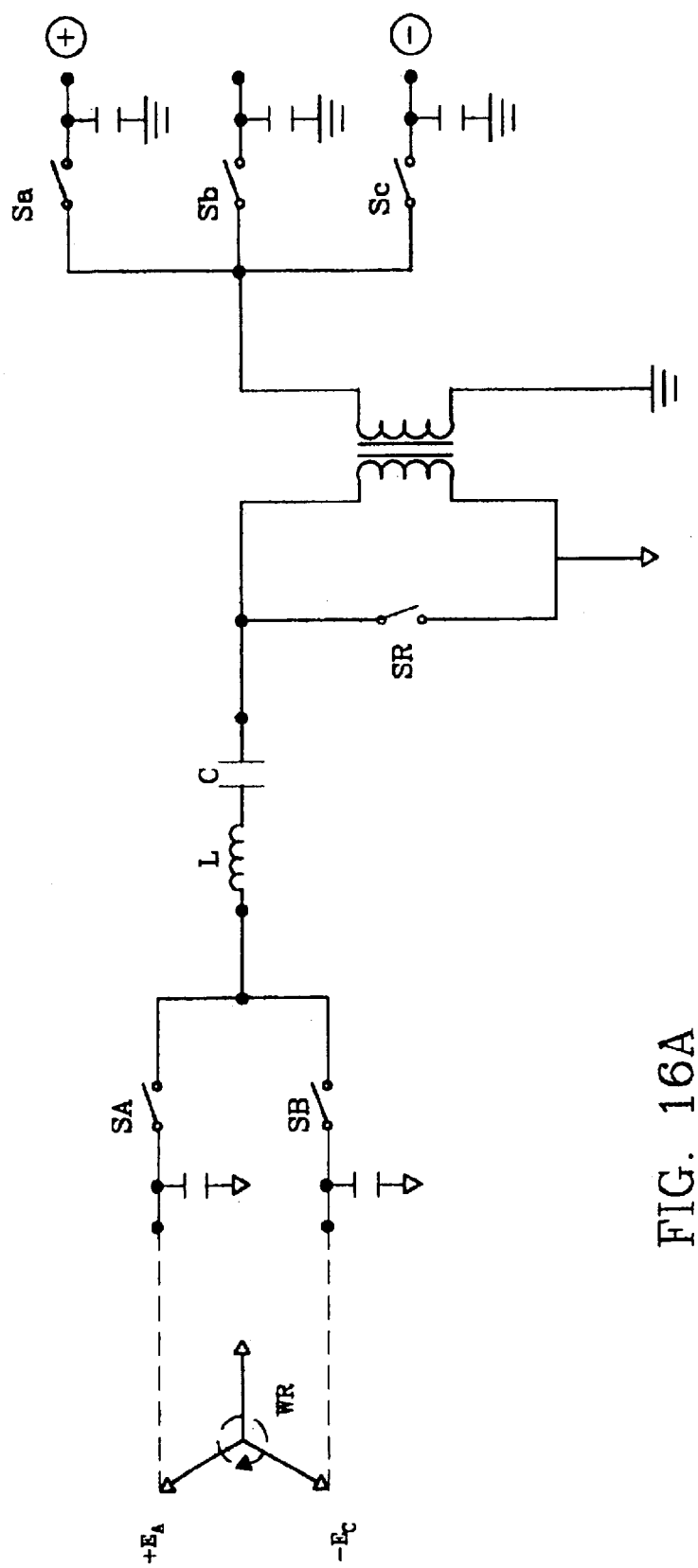
Figure 16B:
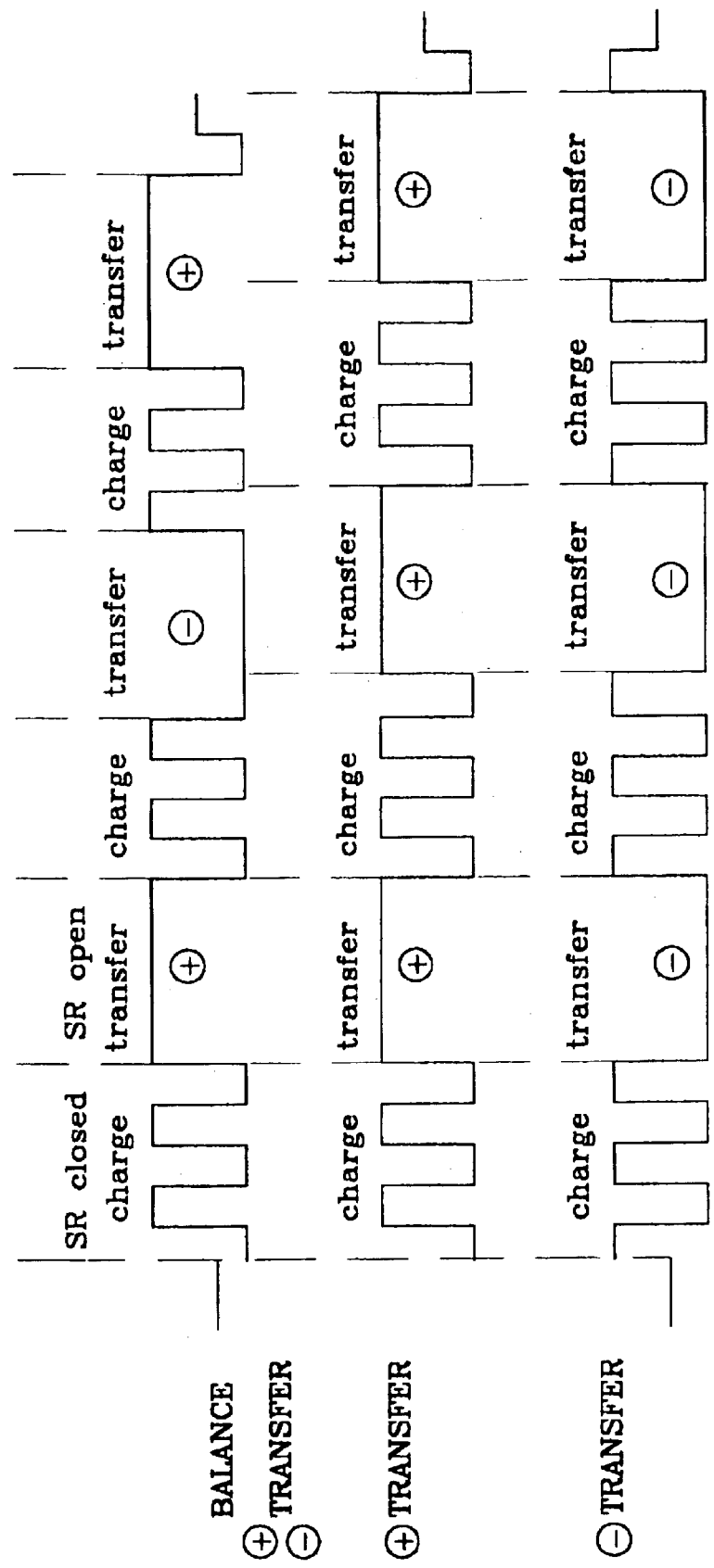
Figure 21:
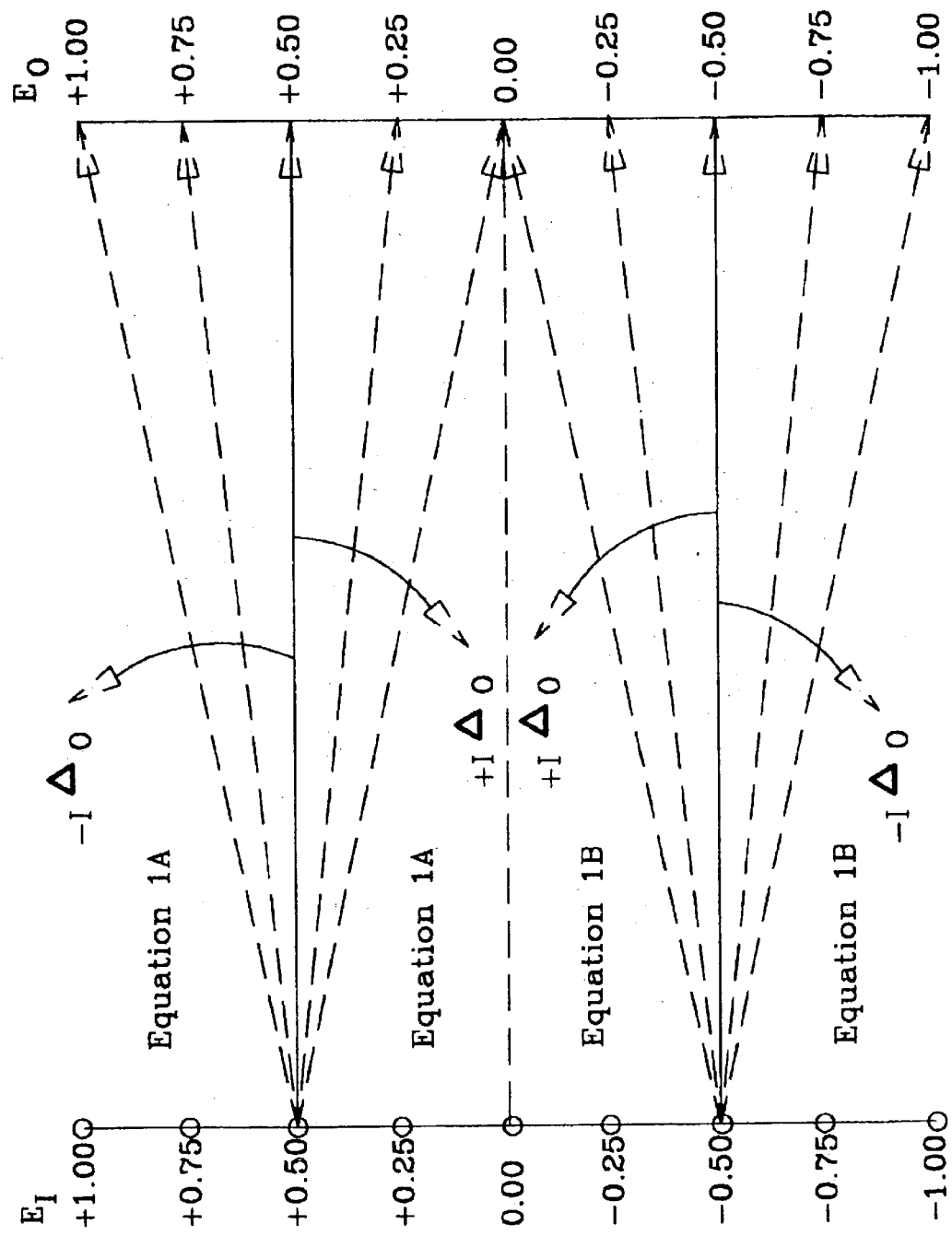
FIG. 21 is a graphic depiction of the energy or power transfer of the energy transfer multiplexer or electro-mechanical energy conversion system of the present invention.
Figure 22:
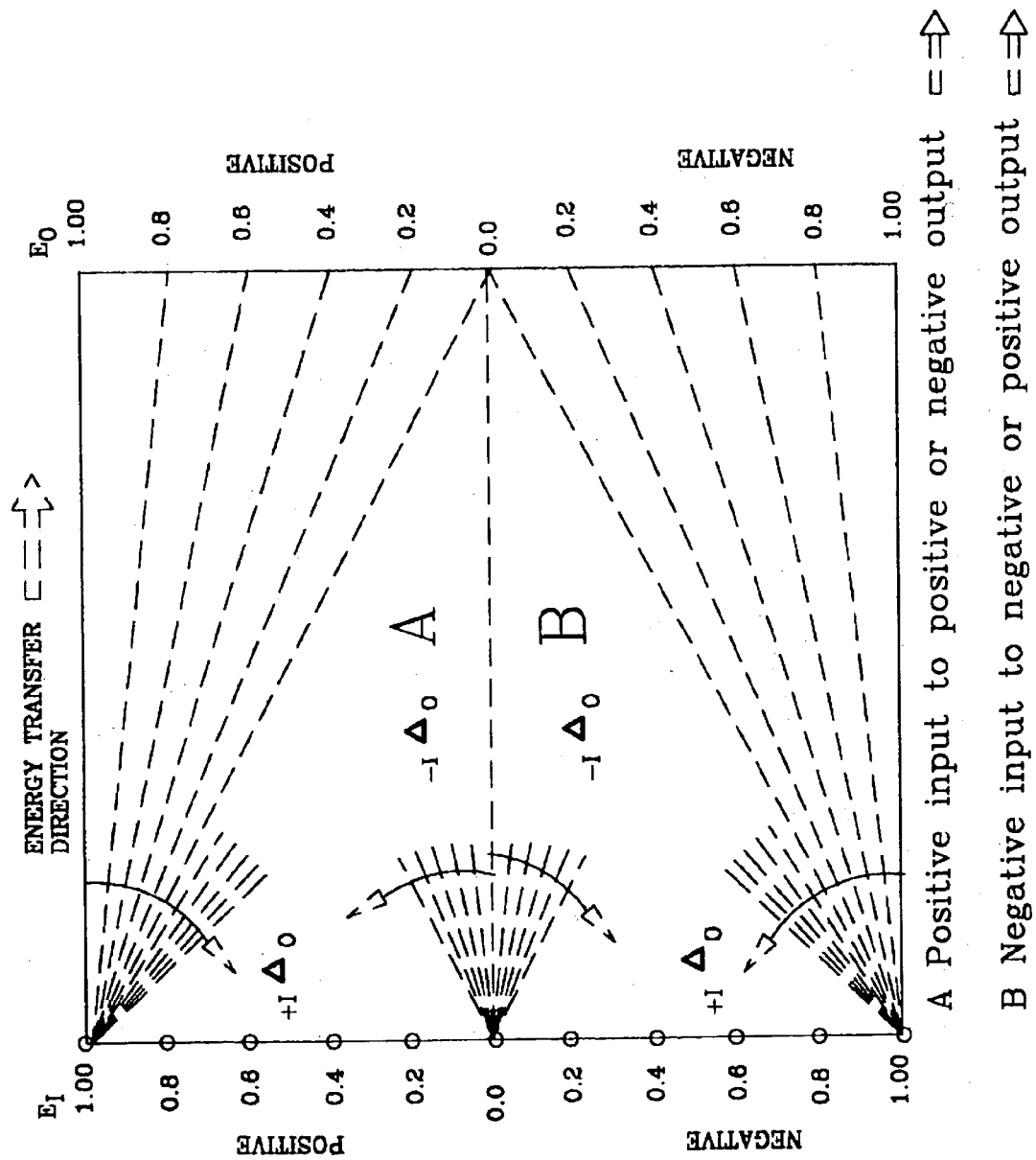
FIG. 22 is another graphic depiction of the energy or power transfer of the energy transfer multiplexer or electro-mechanical energy conversion system of the present invention.

On the other hand, with the correct polarity across the resonant capacitor 124/224, when the $V_{CF}$ is less than a predetermined multiple of $E_{MAX}$ and $V_{CS}$ is less than a predetermined multiple of $E_O$ and the sum of $E_I$ and $V_c$ is less than $E_O$ the poled input phase $E_I$ is connected to $G_O$ to increase the charge on the resonant capacitor 124/224; this sequence may be repeated as indicated in FIGS. 15 and 16B.

With the correct polarity across the resonant capacitor 124, 224, when the $V_{CS}$ is greater than a predetermined multiple of $E_{MAX}$ or the $V_{CF}$ is greater than a predetermined multiple of $E_O$, the poled output phase $E_O$ is connected to $G_I$ to discharge.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An electro-mechanical energy conversion system to convert and transfer energy from an input energy source to an output energy load comprising an energy converter device coupled between the input energy source and the output energy load to receive and to convert energy from the input energy source and to transfer the converted energy to the output energy load and an energy conversion and transfer control operatively coupled to said energy converter device to control the conversion of energy from the input energy source and energy transfer to the output energy load by said energy converter device in response to a plurality of predetermined conditions, said energy converter device comprising an energy converter section including a permanent magnet machine having a rotor and stator to convert the energy from the input energy source and to selectively transfer the converted energy to the output energy load and an energy transfer section including a plurality of stator control elements coupled to said stator and a plurality of rotor control elements coupled to said rotor of said permanent magnet machine, said plurality of stator control elements and said plurality of rotor control elements operatively coupled by a resonant transfer link to transfer energy between said stator and the rotor to control the operation of said permanent magnet machine and wherein said energy conversion and transfer control comprises an energy converter control to control the operation of said energy converter device and a source/load control to control the operation of the input energy source and output energy load with respect to said energy converter device wherein each said stator energy transfer control element comprises a switch coupled to each phase of said stator of said permanent magnet machine.

2. The electro-mechanical energy conversion system of claim 1 wherein the input and output switches are programmed to operate as a charge pump to provide a high switch sample rates to transfer charge at high power and high frequency and to charge pump sequence to provide the required input to output voltage gain at the reduced PMG rotation rates.

3. The electro-mechanical energy conversion system of claim 1 wherein the input switches from each phase is energized in a timed pattern so that the phase AC input is processed by charge transfer directly to a corresponding phase output thereby eliminating the rectification and DC link required with PWM conversion.

4. The electro-mechanical energy conversion system of claim 1 wherein the input and the desired charge transfer conditions to perform soft-start and rapid shut-down of current flow.

5. The electro-mechanical energy conversion system of claim 1 wherein said resonant transfer link provides electrical isolation at above and below said resonant transfer link resonating frequency and whereby the control of the input switches and output switches are driven with a timing pattern and sequence to provide the volt-amps reactance to the three phase load during the fault disturbance.

6. The electro-mechanical energy conversion system of claim 1 wherein said resonant transfer link is bi-directional.

7. The electro-mechanical energy conversion system of claim 1 further includes an isolation element is coupled between said plurality of stator control elements and said plurality of rotor control elements.

8. The electro-mechanical energy conversion system of claim 7 wherein said isolation element comprises a transformer.

9. The electro-mechanical energy conversion system of claim 6 wherein the energy transfer device further includes a stator ground energy transfer control element and a second ground energy transfer control element coupled to ground on each side of said bi-directional resonant transfer link.

10. The electro-mechanical energy conversion system of claim 9 wherein said input switches are time sequenced is a timing pattern to allow each phase of the generator to supply sinusoidal current at the desired generator power factor and sequencing the output switch to supply sinusoidal current at the power factor requested by the AC grid.

11. The electro-mechanical energy conversion system of claim 1 wherein the voltage for each said stator energy transfer control element and each said output phase is interrogated to determine whether or not power for phases on said stator and for phases on said output are within a predetermined range of the predetermined reference level.

12. The electro-mechanical energy conversion system of claim 11 wherein when the initial charge $V_{CS}$ is greater than the output voltage $E_O$, the input voltage $E_I$ is connected to the output voltage $E_O$.

* * * * *